US008970604B2

(12) United States Patent
Nakata et al.

(10) Patent No.: US 8,970,604 B2
(45) Date of Patent: Mar. 3, 2015

(54) STATE DISPLAY DEVICE AND DISPLAY METHOD OF STATE DISPLAY DEVICE

(75) Inventors: Masanori Nakata, Chiyoda-ku (JP); Noriyuki Kushiro, Chiyoda-ku (JP); Makoto Katsukura, Chiyoda-ku (JP); Yoshiaki Koizumi, Chiyoda-ku (JP); Takuya Mukai, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 753 days.

(21) Appl. No.: 13/140,862

(22) PCT Filed: Jan. 21, 2010

(86) PCT No.: PCT/JP2010/000324

§ 371 (c)(1), (2), (4) Date: Jun. 20, 2011

(87) PCT Pub. No.: WO2010/087132

PCT Pub. Date: Aug. 5, 2010

(65) Prior Publication Data

US 2011/0249009 A1 Oct. 13, 2011

(30) Foreign Application Priority Data

Jan. 27, 2009 (JP) ................................ 2009-015602
Jan. 29, 2009 (JP) ................................ 2009-017825
Oct. 1, 2009 (JP) ................................ 2009-229496

(51) Int. Cl.
*G06F 15/00* (2006.01)
*G06T 1/00* (2006.01)
(Continued)

(52) U.S. Cl.
CPC ................ *G09G 5/363* (2013.01); *G09G 5/026* (2013.01); *G09G 5/22* (2013.01); *G09G 5/393* (2013.01)
USPC .......... 345/501; 345/522; 345/418; 345/559; 345/586

(58) Field of Classification Search
USPC .................................. 345/501–506, 522, 643
See application file for complete search history.

(56) References Cited

U.S. PATENT DOCUMENTS 5,664,163 A 9/1997 Yutaka et al.
6,384,831 B1 5/2002 Nakamura et al.
(Continued)

FOREIGN PATENT DOCUMENTS

EP 0 696 023 A2 2/1996
EP 1 878 980 A2 1/2008
(Continued)

OTHER PUBLICATIONS

International Search Report (PCT/ISA/210) issued on Apr. 6, 2010, by Japanese Patent Office as the International Searching Authority for International Application No. PCT/JP2010/000324.
(Continued)

*Primary Examiner* — Maurice L McDowell, Jr.
*Assistant Examiner* — Donna J Ricks
(74) *Attorney, Agent, or Firm* — Buchanan Ingersoll & Rooney PC

(57) ABSTRACT

A state display device capable of reducing a processing load applied to a microcomputer by performing part of a GUI process by hardware and a display method of the state display device are obtained. A rendering processing device starts a process in response to a rendering request stored in a rendering request region when a starting command is stored in a start/end instruction register. When a rendering request specified by an instruction address is a rendering termination request, the rendering processing means terminates the process performed in response to the rendering request, stores a termination factor in an interruption factor register, and issues an interruption to a central processing device.

6 Claims, 19 Drawing Sheets

(51) Int. Cl.

| | |
|---|---|
| ***G06T 15/00*** | (2011.01) |
| ***G09G 5/36*** | (2006.01) |
| ***G09G 5/00*** | (2006.01) |
| ***G09G 5/02*** | (2006.01) |
| ***G09G 5/22*** | (2006.01) |
| ***G09G 5/393*** | (2006.01) |

(56) References Cited

U.S. PATENT DOCUMENTS

| | | | | |
|---|---|---|---|---|
| 6,583,788 | B1 | 6/2003 | Ali-Santosa | |
| 7,307,635 | B1 | 12/2007 | Yang et al. | |
| 7,538,772 | B1 * | 5/2009 | Fouladi et al. | 345/535 |
| 2003/0080963 | A1 * | 5/2003 | Van Hook et al. | 345/501 |
| 2006/0101244 | A1 * | 5/2006 | Siu et al. | 712/221 |
| 2008/0238866 | A1 | 10/2008 | Saito | |

FOREIGN PATENT DOCUMENTS

| | | | |
|---|---|---|---|
| JP | 59-047665 | A | 3/1984 |
| JP | 60-95490 | A | 5/1985 |
| JP | 5-048851 | A | 2/1993 |
| JP | 05-204591 | A | 8/1993 |
| JP | 05-290180 | A | 11/1993 |
| JP | 07-168558 | A | 7/1995 |
| JP | 07-225573 | A | 8/1995 |
| JP | 7-271344 | A | 10/1995 |
| JP | 7-282273 | A | 10/1995 |
| JP | 09-034411 | A | 2/1997 |
| JP | 10-145635 | A | 5/1998 |
| JP | 10-288980 | A | 10/1998 |
| JP | 11-184454 | A | 7/1999 |
| JP | 2000-099761 | A | 4/2000 |
| JP | 2002-269576 | A | 9/2002 |
| JP | 2002-336542 | A | 11/2002 |
| JP | 2003-153258 | A | 5/2003 |
| JP | 2006-185195 | A | 7/2006 |
| JP | 2008-249977 | A | 10/2008 |

OTHER PUBLICATIONS

Office Action (Notification of Reasons for Refusal) dated Mar. 13, 2012, issued in the corresponding Japanese Patent Application No. 2009-015602, and an English Translation thereof. (5 pages).

Office Action (Notification of Reasons for Refusal) dated Mar. 13, 2012, issued in the corresponding Japanese Patent Application No. 2009-017825, and an English Translation thereof. (4 pages).

Office Action (Notification of Reason for Refusal) dated Nov. 6, 2012, issued by the Japanese Patent Office in the corresponding Japanese Patent Application No. 2009-017825 and an English translation thereof. (5 pages).

Office Action (Notice of Reasons for Rejection) dated Nov. 6, 2012, issued by the Japanese Patent Office in the corresponding Japanese Application No. 2009-015602 and an English translation thereof. (5 pages).

Japanese Office Action (Decision of Rejection) dated May 28, 2013, issued by the Japanese Patent Office in corresponding Japanese Application No. 2009-015602, and a English Translation thereof. (3 pgs).

Japanese Office Action (Decision of Dismissal of Amendment) dated May 28, 2013, issued by the Japanese Patent Office in corresponding Japanese Application No. 2009-015602, and a English Translation thereof. (6 pgs).

Japanese Office Action (Decision of Rejection) dated May 28, 2013, issued by the Japanese Patent Office in corresponding Japanese Application No. 2009-017825, and a English Translation thereof. (3 pgs).

Japanese Office Action (Decision of Dismissal of Amendment) dated May 28, 2013, issued by the Japanese Patent Office in corresponding Japanese Application No. 2009-017825, and a English Translation thereof. (6 pgs).

Chinese Office Action dated Aug. 26, 2013, issued by the Chinese Patent Office in corresponding Chinese Patent Application No. 201080005758.4, and English language translation of Office Action. (10 pages).

Japanese Office Action (Notification of Reason of Rejection) dated Jul. 24, 2012, issued in corresponding Japanese Patent Application No. 2009-229496A. (3 pages).

The extended European Search Report dated Jun. 5, 2012, issued in corresponding European Patent Application No. 10735604.0. (8 pages).

The extended European Search Report dated Jun. 5, 2012, issued in corresponding European Patent Application No. 11006171.0. (8 pages).

The extended European Search Report dated Jun. 18, 2012, issued in corresponding European Patent Application No. 11006172.8. (7 pages).

Office Action from Chinese Patent Office issued on Apr. 22, 2014, in corresponding Chinese Patent Application No. 20108005758.4, with a partial English translation thereof.

* cited by examiner (A) SQUARE FRAME RENDERING (B) SOLID SQUARE RENDERING (C) LINE RENDERING (A) SQUARE FRAME RENDERING (B) SOLID SQUARE RENDERING (RENDERING NOT AVAILABLE)

(a)

(b)

(a)

(b)

STATE DISPLAY DEVICE AND DISPLAY METHOD OF STATE DISPLAY DEVICE

TECHNICAL FIELD

The present invention relates to a state display device which displays a state of a home electrical appliance such as an air conditioner and a display method employed by the state display device.

BACKGROUND ART

Embedded devices such as air conditioners and home electrical appliances accelerate to have multifunctionality. Then, it is difficult to operate, in a conventional way, such an embedded device only using a combination of a plurality of buttons and a liquid crystal display (such as a segment liquid crystal display) which displays fixed content directly relating to the buttons.

Therefore, electric apparatuses employing display devices which use general liquid crystal (so-called full-dot liquid crystal) and which includes so-called graphical user interfaces (GUIs) have been fabricated. As the GUIs, arbitrary diagrams and images are displayed in a liquid crystal screen, and multifunctionality and usability are supported by a method of switching screen displays in the liquid crystal screen from one to another or a method of adding display of a small window used for explanation in the screen. Therefore, users can easily use functions of electric devices, and accordingly, operability is improved.

However, in the display device of these electric devices, content to be displayed in a liquid crystal display and an operation device have considerable restrictions from the viewpoint of fabrication cost.

Considering cost, heat generation, and power consumption, a microcomputer used in an embedded device has low processing performance compared with that in a personal computer. As for a performance ratio thereof, a speed is 1/100 or lower compared to the microcomputer of the personal computer and a storage capacity is 1/1000 or lower of the microcomputer of the personal computer in most cases.

Since the full dot liquid crystal described above realizes display having a high degree of freedom by combining small luminous points, the full dot liquid crystal requires a number of instructions in order to display a single diagram. When a diagram of 1 cm square is to be rendered, for example, approximately a hundred of small luminous points should be changed, and accordingly, approximately a thousand instructions are required.

Most of the processing power of the microcomputer is consumed to realize a GUI process of combining such display diagrams with one another and frequently performing rendering by changing display screens from one to another, and furthermore, most of the storage capacity is consumed to perform intermediate information processing. Therefore, execution of a control application program which realizes an original function of the embedded device may be delayed. As a result, it becomes difficult to design the control application program, and accordingly, it is possible that the number of developing processes is increased.

To address this problem, an apparatus including dedicated hardware (graphic accelerator) used to execute part of the GUI process has been proposed (refer to Patent Literature 1, for example).

CITATION LIST

Patent Literature

Patent Literature 1: Japanese Unexamined Patent Application Publication No. 2006-185195 (Page 4)

A processing speed of the GUI process performed using hardware is considerably faster than that performed using software. This is because the microcomputer performs processes in synchronization with a minimum unit clock on a process-by-process basis whereas the hardware performs a parallel process independently from the clock and furthermore a degree of the parallel process can be optimized. In this way, by performing the GUI process using the dedicated hardware, a main control application can occupy the processing power of the microcomputer. In a case where the GUI process is performed using the hardware, for example, when a diagram of 1 cm square is to be rendered, approximately only ten instructions are required to calculate edge points. Furthermore, when the GUI process is performed using hardware, a unit of a rendering command such as “line rendering”, “color calculation”, or the like is used.

However, when the GUI process is performed using hardware as described above in unit of a rendering command, processes relating to GUIs are not completely separated from the microcomputer. That is, when much information is displayed on the liquid crystal screen as diagrams or images and a display screen is switched, a rendering request is frequently generated. Therefore, the microcomputer consumes most of the processing power to perform the process regarding rendering requests. Accordingly, although execution of rendering commands can be performed independently from the microcomputer, the process regarding the rendering requests should be performed by the microcomputer, and consequently, a processing load applied to the microcomputer is heavy.

Conversely, it is difficult to perform all the GUI processes using the hardware. This is because, since different GUI display processes are performed for different applications or different products, dedicated hardware is required for each application or each product, and accordingly, a large burden and large cost are required.

SUMMARY OF INVENTION

Technical Problem

The present invention has been made to solve the problems described above, and provides a state display device which corresponds to a display device in which part of a GUI process is performed using hardware and which reduces a processing load of a microcomputer, and a display method of the state display device.

Solution to Problem

A state display device according to the present invention includes a liquid crystal display unit, and a rendering generation unit which generates display content to be displayed in the liquid crystal display unit, wherein the rendering generation unit includes a central processing unit, a rendering processing unit, first storage means, and second storage means, the first storage means is readable and writable by both the central processing unit and the rendering processing unit, the second storage means is readable and writable by the rendering processing unit and readable by the liquid crystal display unit, the central processing unit interprets and executes a display program and instructs the first storage means to store a rendering request based on a result of the execution, the rendering processing unit includes an instruction address register which stores an instruction address serving as an address of the rendering request to be executed, and performs a series of a rendering execution process including a process of interpreting the rendering request stored in the first storage means in accordance with the instruction address, a process of calculating a coordinate and a color of a luminous point of liquid crystal when the interpreted rendering request is a rendering execution request, a process of storing the coordinate and the color obtained as the result of the calculation in the second storage means, and a process of updating the instruction address, the liquid crystal display unit allows luminous points of the liquid crystal to generate color in accordance with coordinates and colors stored in the second storage means, the rendering processing unit includes a start/end instruction register which stores a starting command for instructing start of the rendering execution process and an interruption factor register which stores a factor of an interruption issued to the central processing unit, and the rendering processing unit starts a process in accordance with the rendering request stored in the first storage means when the starting command is stored in the start/end instruction register, terminates the process being performed in accordance with the rendering request when the rendering request specified by the instruction address is a rendering termination request, stores an termination factor in the interruption factor register, and issues an interruption to the central processing unit.

Advantageous Effects of Invention

According to the present invention, the rendering processing means performs the rendering processing process independently from the central processing unit in a period of time from when the starting command is written to the start/end instruction register to when the rendering request for requesting performance of the rendering termination process is executed.

Accordingly, since processes regarding a GUI are performed using hardware, a high-speed effect can be obtained.

Furthermore, the rendering processing unit may execute a series of rendering commands independently from the central processing unit. Therefore, the central processing unit may assign calculation resources to processes other than the processes regarding the GUI, and accordingly, a processing load applied to the central processing unit at a time of a rendering process can be reduced.

DESCRIPTION OF EMBODIMENTS

Embodiment 1

In Embodiment 1, a state display device which is incorporated in an embedded device such as an air conditioner and which displays a state of the air conditioner will be described as an example.

Figure 1:
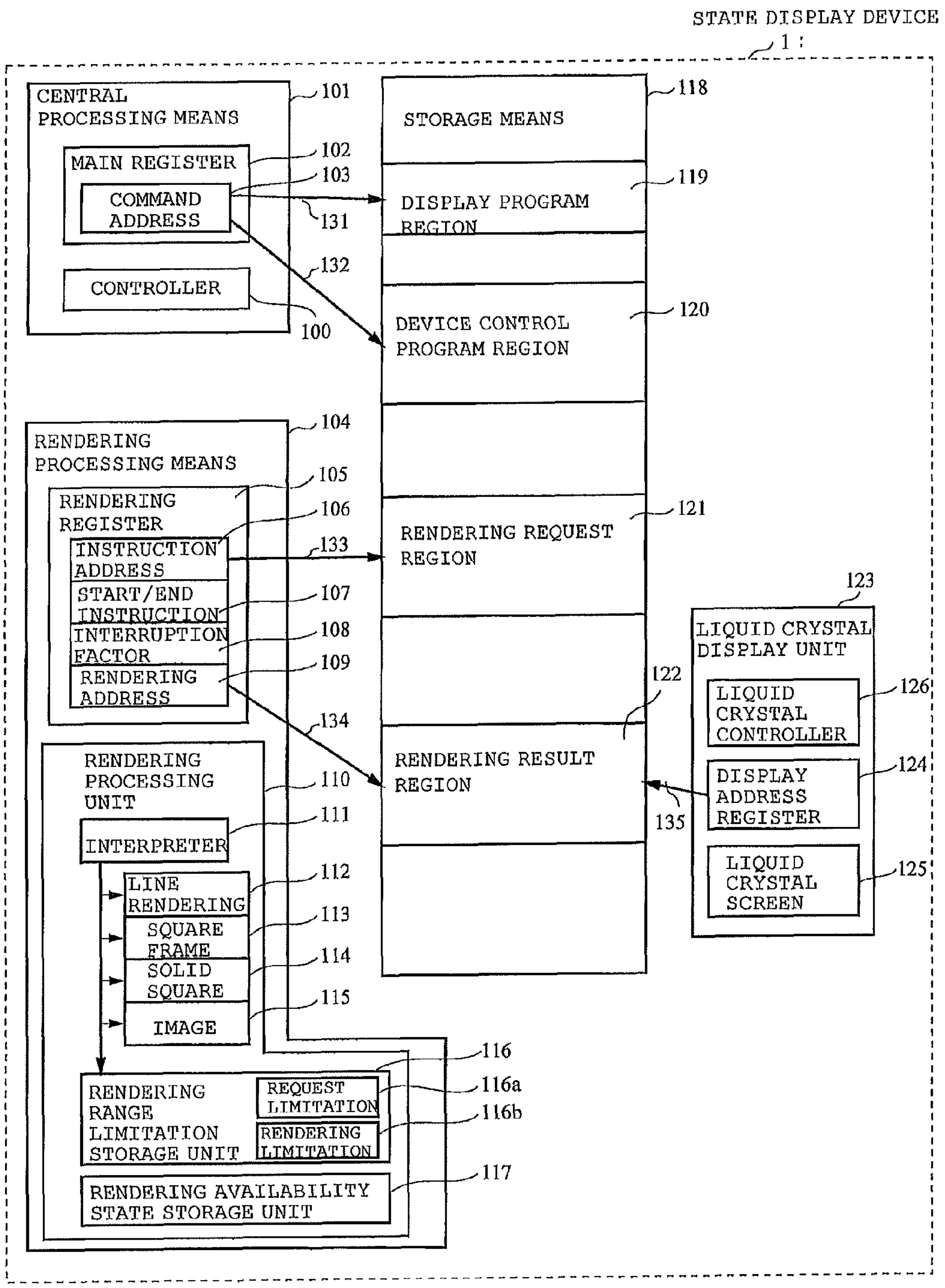
FIG. 1 is a block diagram illustrating a display device according to Embodiment 1 of the present invention.

FIG. 1 is a block diagram illustrating a state display device 1 according to Embodiment 1 of the present invention. In FIG. 1, the state display device 1 includes central processing means 101, rendering processing means 104, storage means 118, and a liquid crystal display unit 123 including a liquid crystal screen 125. Note that the central processing means 101 and the rendering processing means 104 are preferably integrated on an identical microcomputer LSI.

First, the storage means 118 will be described.

The storage means 118 may be accessed by both the central processing means 101 and the rendering processing means 104, and stores various programs to be executed by the central processing means 101 and the rendering processing means 104 and calculation results. The storage means 118 includes a display program region 119, a device control program region 120, a rendering request region 121, and a rendering result region 122.

The display program region 119 stores a display program used to perform display in the liquid crystal display unit 123. The device control program region 120 stores a device control program used to control entire operation of the state display device 1. The display program and the device control program are executed by the central processing means 101.

The rendering request region 121 stores various rendering request to be executed by the rendering processing means 104. In accordance with results of various calculations performed by the central processing means 101, rendering requests are written to the rendering request region 121.

The rendering result region 122 is a storage region which stores rendering data to be displayed in the liquid crystal screen 125, and is generally referred to as a frame buffer. The rendering result region 122 includes storage spaces assigned to addresses of luminous-point coordinates of liquid crystal of the liquid crystal display unit 123. Although a case where the rendering result region 122 corresponds to a luminous-point coordinate of the liquid crystal of the liquid crystal display unit 123 on a one-to-one basis is taken as an example in Embodiment 1, a plurality of rendering result regions may be provided for the liquid crystal display unit 123.

Note that the display program region 119 and the device control program region 120 are preferably constituted by nonvolatile storage devices such as a DRAM or an SRAM, and the rendering request region 121 and the rendering result region 122 are preferably constituted by volatile storage devices such as a ROM.

Furthermore, the storage means 118 is preferably implemented on the microcomputer LSI on which the central processing means 101 and the rendering processing means 104 are implemented, and the microcomputer LSI preferably corresponds to a system LSI.

Next, the central processing means 101 will be described.

The central processing means 101 is constituted by a microcomputer, for example, and includes a main register 102 and a controller 100.

The controller 100 executes a device control program to control the entire state display device 1 in a unit of clock, executes a display program used to perform display in the liquid crystal display unit 123, and performs various calculation processes.

The main register 102 includes a data register which performs various calculation processes and an address register which specifies an address used to access the storage means 118. However, in Embodiment 1, only a command address register 103 is shown in the drawing.

The command address register 103 store addresses in the storage means 118 corresponding to commands executed by the controller 100. In FIG. 1, arrow marks 131 and 132 which extend from the command address register 103 to the storage means 118 represent that the command address register 103 specifies addresses of the storage means 118.

Next, the rendering processing means 104 will be described.

The rendering processing means 104 is a logic circuit specialized for the liquid crystal display and has a function of reading from and writing to the storage means 118. The rendering processing means 104 includes a rendering register 105 and a rendering processing unit 110. Furthermore, the rendering register 105 includes an instruction address register 106, a start/end instruction register 107, an interruption factor register 108, and a rendering address register 109.

The instruction address register 106 stores an address which is in the storage means 118 and which corresponds to an instruction (hereinafter referred to as a "rendering request") to be executed by the rendering processing unit 110. In FIG. 1, an arrow mark 133 represents that the instruction address register 106 specifies an address of the storage means 118.

The start/end instruction register 107 stores a starting command which instructs the rendering processing unit 110 to start a rendering process.

The interruption factor register 108 stores an interruption factor when the rendering processing means 104 issued an interruption signal to the central processing means 101.

The rendering address register 109 stores an address in the storage means 118 to which a result of the rendering process performed by the rendering processing unit 110 is written. Note that an arrow mark 134 extending from the rendering address register 109 to the storage means 118 represents that the rendering address register 109 specifies an address included in the storage means 118.

The rendering processing unit 110 includes an interpreter 111, logic circuits with special rendering functions comprising a line rendering circuit 112, a square frame rendering circuit 113, a solid square rendering circuit 114, and an image rendering circuit 115, a rendering range limitation storage unit 116, and a rendering availability state storage unit 117.

The interpreter 111 interprets a rendering request and activates one of the line rendering circuit 112, the square frame rendering circuit 113, the solid square rendering circuit 114, and the image rendering circuit 115. Note that, in a description described below, the line rendering circuit 112, the square frame rendering circuit 113, the solid square rendering circuit 114, and the image rendering circuit 115 are collectively referred to as a rendering logic circuit where appropriate.

The rendering range limitation storage unit 116 stores a range in which the rendering processing means 104 can perform rendering as a limitation range. That is, the rendering processing means 104 does not perform rendering in regions other than the rendering range stored in the rendering range limitation storage unit 116. The rendering range limitation storage unit 116 includes two sorts of rendering range limitation, i.e., a request limitation **116*a* and a rendering limitation 116*b***.

The request limitation **116*a* corresponds to a rendering limitation range specified by a rendering request. In other words, the request limitation 116*a* corresponds to a range which is a limit of rendering in accordance with a result of execution of a display program. The rendering processing means 104 does not perform rendering in regions other than the range represented by the request limitation 116*a***.

The rendering limitation **116*b* corresponds to a rendering limitation range calculated in accordance with the rendering result region 122. Since the rendering result region 122 corresponds to an address of a luminous point coordinate, the rendering limitation 116*b* is basically translated into a range which can be displayed in the liquid crystal screen 125 in the liquid crystal display unit 123**.

Note that, when a plurality of rendering result regions (frame buffers) are assigned to the liquid crystal screen 125 of the liquid crystal display unit 123, a range which can be actually displayed in the liquid crystal screen 125 may be separately stored as a rendering limitation range.

Note that a first rendering range limitation of the present invention corresponds to the rendering limitation 116*b* whereas a second rendering range limitation corresponds to the request limitation 116*a*.

The rendering availability state storage unit 117 stores information representing whether rendering has been performed on the rendering result region 122 or rendering has not been performed on the rendering result region 122.

Note that first rendering availability variable and second rendering availability variable are stored in the rendering availability state storage unit 117.

The liquid crystal display unit 123 includes a liquid crystal controller 126, a display address register 124, and the liquid crystal screen 125 and is stored in a housing not shown.

It is assumed that full dot liquid crystal is used in the liquid crystal display unit 123 and the full dot liquid crystal emits light at high speed in accordance with a change of a display position from an upper left side to a right side of the screen and further to a lower side with time so that a two-dimensional image is generated by an effect of an afterimage which remains in eyes.

The liquid crystal controller 126 is an LCD controller which performs display control of the liquid crystal screen 125 in accordance with rendering data in the rendering result region 122.

The liquid crystal screen 125 has the liquid crystal which is aggregate of small luminous points and performs screen display under display control of the liquid crystal controller 126.

The display address register 124 stores an address in the storage means 118 which stores luminous values and color values used to make the luminous points in the liquid crystal screen 125 emit light. The liquid crystal controller 126 obtains rendering data specified by the display address register 124 from the rendering result region 122 so as to make the luminous points of the liquid crystal screen 125 emit light. Note that an arrow mark 135 extending from the display address register 124 to the storage means 118 represents that the display address register 124 specifies an address in the storage means 118.

Next, an outline of an operation of displaying a screen in the liquid crystal screen 125 will be described.

Figure 2:
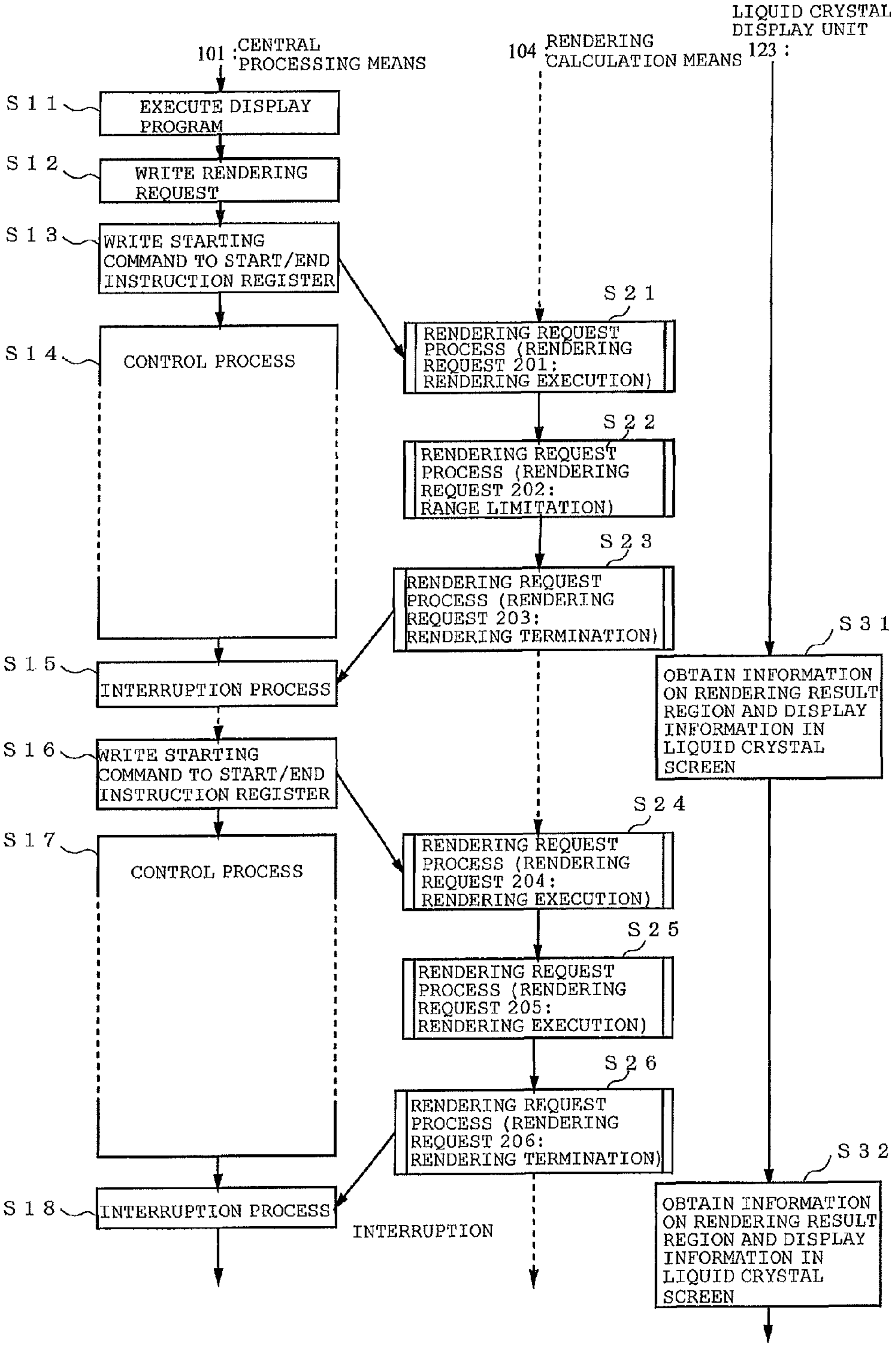
FIG. 2 is a flowchart illustrating operation of the display device according to Embodiment 1 of the present invention.

FIG. 2 is a flowchart illustrating an operation of the state display device 1 regarding display performed by the liquid crystal screen 125, that is, outlines of operations performed by the central processing means 101, the rendering processing means 104, and the liquid crystal display unit 123.

(1) Operation of Central Processing Means 101

(Step S11)

The central processing means 101 executes a predetermined calculation process in accordance with a display program (in step S11). Specifically, the central processing means 101 specifies a command in the display program region 119 in accordance with a command address stored in the command address register 103. Then, the central processing means 101 interprets the specified command in accordance with content of a definition in the central processing means 101 and performs required processes including four arithmetic operations, a logical operation, data transfer, a change of an instruction address, and a change of an conditional instruction address. The central processing means 101 controls display of the liquid crystal display unit 123 using a program obtained by combining the calculations and the like with one another. Note that, although not shown in FIG. 2, the entire operation of the state display device 1 is controlled in accordance with a device control program.

(Step S12)

The central processing means 101 writes a rendering request in the rendering request region 121 in the storage means 118 based on a result of the execution of the display program (in step S12).

Figure 3:
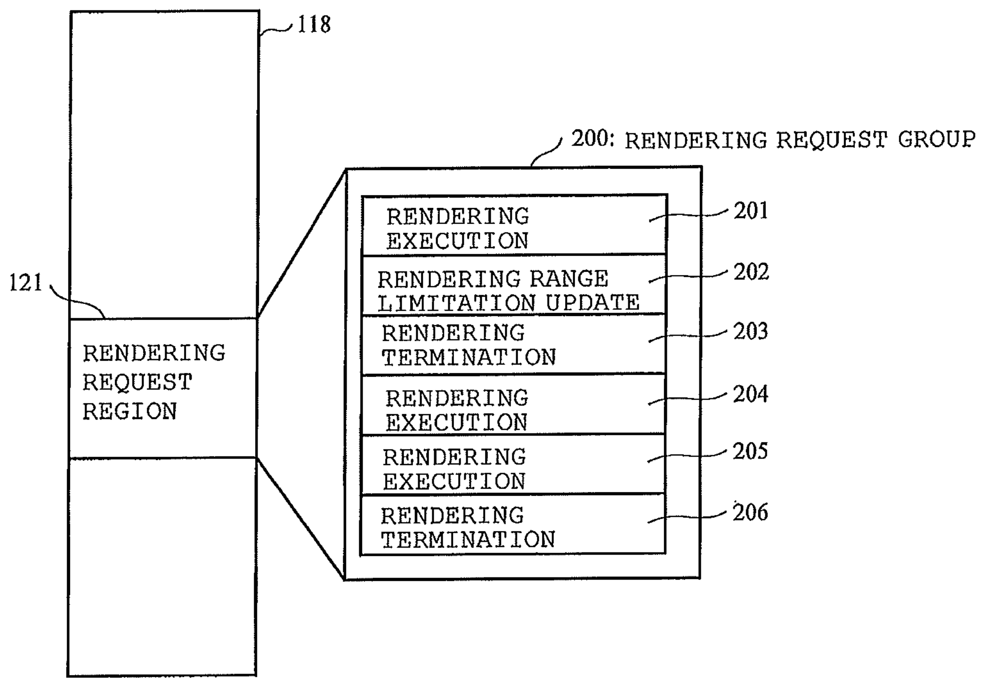
FIG. 3 is a diagram illustrating an exemplar configuration of a rendering request region.

Here, an example of a configuration of a rendering request group 200 stored in the rendering request region 121 is shown in FIG. 3. Note that only the rendering request region 121 is in the storage means 118 shown in FIG. 3.

The rendering request group 200 includes rendering requests 201 to 206. In FIG. 3, text "rendering execution", "rendering range limitation update", and "rendering end" in the rendering requests 201 to 206 represent types of rendering request (which will be described in detail hereinafter). Rendering processes corresponding to the types of rendering request are performed.

(Step S13)

The central processing means writes a starting command to the start/end instruction register 107 in the rendering processing means 104. The writing of the starting command serves as a trigger of start of a process performed by the rendering processing means 104.

(Step S14)

Thereafter, the central processing means performs a process of controlling another control application in accordance with the device control program.

(Step S15)

When the rendering processing means 104 issued an interruption command, the central processing means performs a predetermined interruption process. Here, the central processing means may refer to the interruption factor register 108 and perform the interruption process in accordance with stored information.

(Step S16)

When the process of the rendering processing means 104 is to be restarted, central processing means writes a starting command to the start/end instruction register 107.

(Step S17)

Thereafter, a process of controlling another control application is performed in accordance with the device control program.

(Step S18)

When the rendering processing means 104 issued an interruption command again, the central processing means 101 performs the predetermined interruption process.

That is, the central processing means 101 performs the control process separately from the rendering processing means 104 in a period of time from when the starting command is written to the start/end instruction register 107 to when the rendering processing means 104 issues the interruption command.

(2) Operation of Rendering Processing Means 104

Next, operation of the rendering processing means 104 will be described.

(Step S21)

When the starting command is written to the start/end instruction register 107, a rendering request process is performed in accordance with the rendering request stored in the rendering request region 121.

Here, an operation of the rendering request process shown in FIG. 2 will be described.

Figure 4:
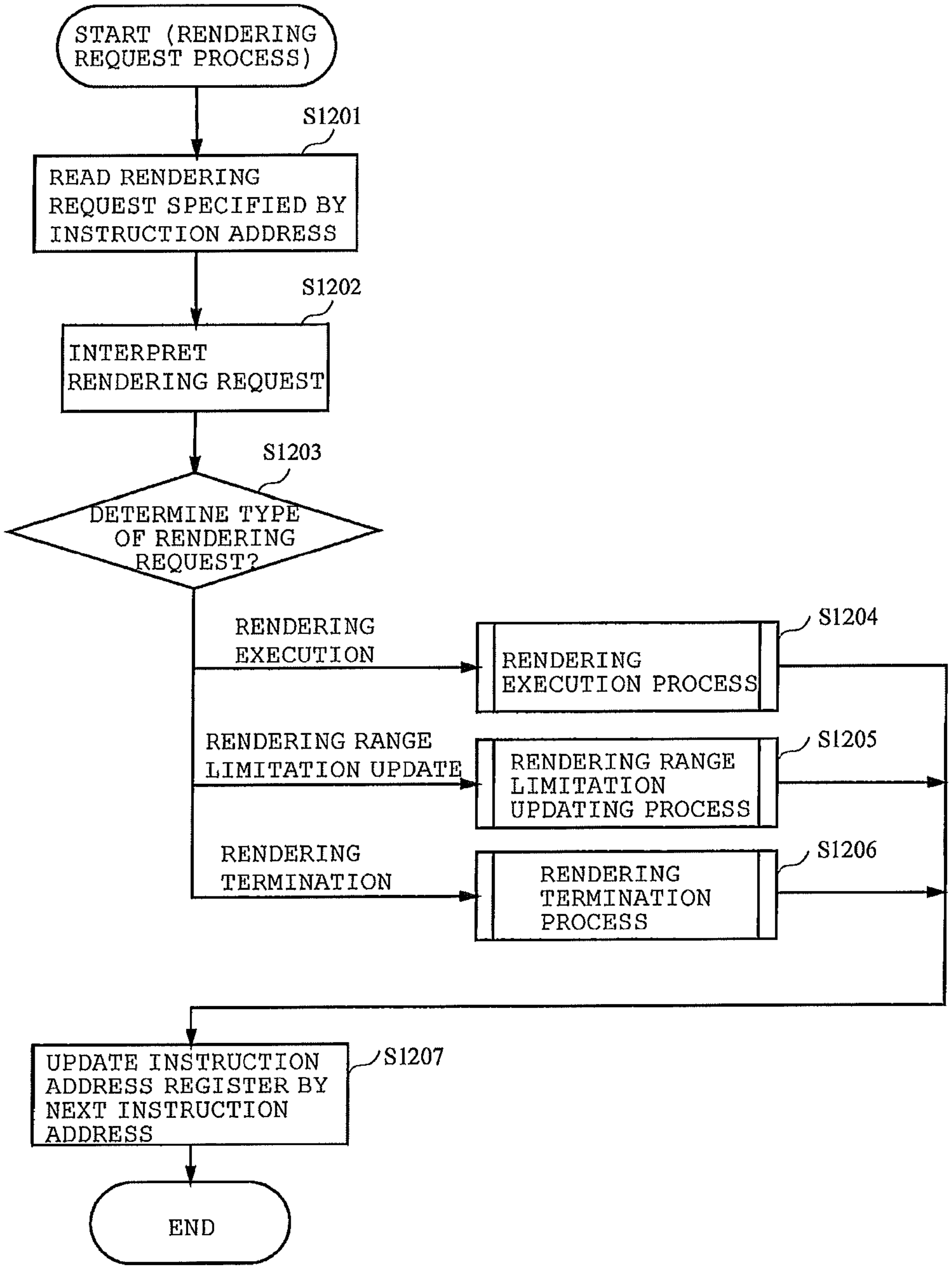
FIG. 4 is a flowchart illustrating a rendering request process shown in FIG. 2.

FIG. 4 is a flowchart illustrating the operation of the rendering request process.

In FIG. 4, the rendering processing means 104 reads a rendering request specified by an instruction address stored in the instruction address register 106 from the rendering request region 121 (in step S1201). Then, the rendering processing means 104 interprets the read rendering request using the interpreter 111 (in S1202). Here, three types of rendering request, i.e., a rendering request "rendering execution" used to execute rendering of a line and a rectangular shape, a rendering request "rendering range limitation update" used to update the request limitation 116*a* of the rendering range limitation storage unit 116, and a rendering request "rendering end" used to terminate the rendering process are provided.

The process branches in accordance with the types of rendering request (in step S1203), and processes corresponding to the rendering requests are performed (in step S1204, step S1205, and step S1206).

After the processes are terminated, the instruction address in the instruction address register 106 is updated to a next instruction address (in step S1206), and the process is terminated.

Accordingly, when the rendering request process is performed again, a rendering request specified by the instruction address updated in step S1206 is executed. In this way, processes corresponding to rendering requests stored in the rendering request region 121 are sequentially executed.

The operation of the rendering request process has been described hereinabove.

Next, an operation of the rendering execution process shown in FIG. 4 will be described. In the rendering execution process, various calculation processes for performing rendering such as rendering of a line and rendering of a square frame are performed, and coordinates and colors obtained as results of the calculations are stored in the rendering result region 122.

Figure 5:
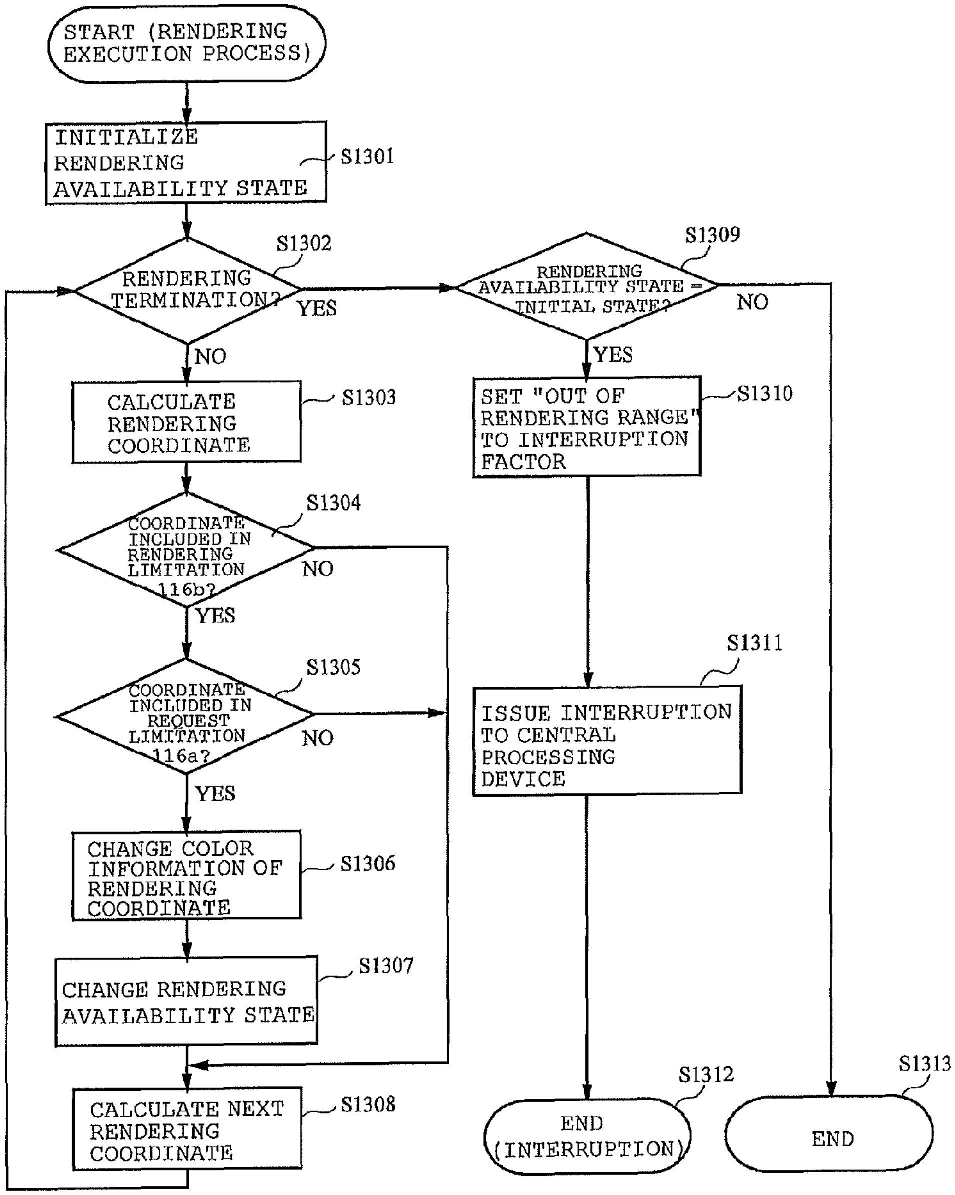
FIG. 5 is a flowchart illustrating a rendering execution process shown in FIG. 4.

FIG. 5 is a flowchart illustrating the rendering execution process. When starting the rendering execution process, the rendering processing means 104 initializes the rendering availability state storage unit 117 (in step S1301).

Next, it is determined whether the rendering process is terminated or not (in step S1302). When the determination is affirmative, the process proceeds to step S1308 whereas when the determination is negative, the process proceeds to step S1303. Here, assuming that a termination condition is not satisfied, and therefore, it is determined that the rendering process is not terminated, the process proceeds to step S1303.

In step S1303, a coordinate to be subjected to the rendering is calculated in accordance with the rendering request (in step S1303). Then, it is determined whether the calculated rendering coordinate is in the rendering limitation 116*b* stored in the rendering range limitation storage unit 116 or not (in step S1304). The fact that the calculated rendering coordinate is included in the rendering limitation 116*b* means that a graphic to be rendered, for example, can be rendered in the rendering result region 122. This determination is made by comparing a coordinate of the calculation result of the rendering coordinate in a horizontal direction with a coordinate of the rendering limitation 116*b* in the horizontal direction and comparing a coordinate of the calculation result of the rendering coordinate in a vertical direction with a coordinate of the rendering limitation 116*b* in the vertical direction. When the determination is affirmative, the process proceeds to step S1305 whereas when the determination is negative, the process proceeds to step S1308.

In step S1305, it is determined whether the rendering coordinate calculated in step S1303 is included in the request limitation 116*a* stored in the rendering range limitation storage unit 116 or not (in step S1305). A method of the determination is the same as that in step S1304. When the determination is affirmative, the process proceeds to step S1306 whereas when the determination is negative, the process proceeds to step S1308.

When the rendering coordinate is included in the rendering limitation 116*b* and the request limitation 116*a*, color values of the rendering coordinate included in the rendering result region 122 is changed (in step S1306). Subsequently, information included in the rendering availability state storage unit 117 is changed to information representing a rendering available state (in step S1307) and a next rendering coordinate is calculated (in step S1308).

Thereafter, it is determined whether the rendering process is terminated or not (in step S1302). The process from step S1303 to step S1308 is repeatedly performed on all coordinates of a region specified by the rendering request. For example, when a request for rendering a solid square is issued, the process from step S1303 to step S1308 is repeatedly performed on all coordinates included in a region of the solid square. After the process from step S1303 to step S1308 has been performed on the coordinates to be rendered, the rendering termination condition is satisfied (in step S1302).

When the termination condition of the rendering process is satisfied in step S1302, it is determined whether the rendering availability state is an initial state or not (in step S1309). When the rendering availability state stored in the rendering availability state storage unit 117 is not the initial state, the rendering availability state has been changed in step S1307 and rendering has been performed on the rendering result region 122. In this case, the rendering execution process is terminated (in step S1313).

On the other hand, when it is determined that the rendering availability state is the initial state in step S1309, the rendering has not been performed on the rendering result region 122. In this case, an interruption factor "out of rendering range" is set in the interruption factor register 108 (in step S1310). Then, an interruption request is issued to the central processing means 101 (in step S1311), and the rendering execution process is terminated (in step S1312). In this case, the execution of the rendering request process itself is stopped.

Note that, an execution state storage, not shown, is preferably included in the rendering processing means 104 so that a determination as to whether a rendering calculation is to be interrupted is performed in step S1312. That is, when the execution state memory represents a developing state, the rendering calculation is interrupted whereas when the execution state memory represents completion of development, the rendering calculation is not interrupted.

The operation of the rendering execution process has been described hereinabove.

Next, a rendering-range limitation updating process shown in FIG. 4 will be described. In the rendering-range limitation updating process, the request limitation 116*a* stored in the rendering range limitation storage unit 116 is updated in accordance with a rendering request.

Figure 6:
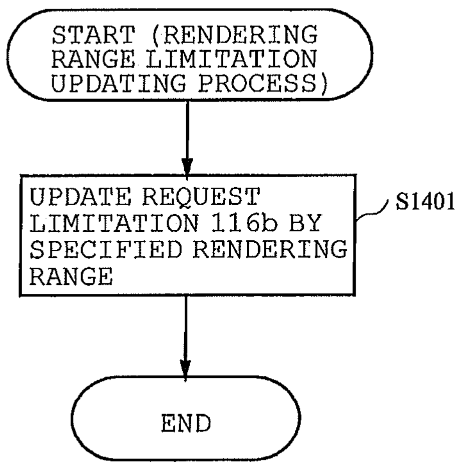
FIG. 6 is a flowchart illustrating a rendering-range limitation updating process shown in FIG. 4.

FIG. 6 is a flowchart illustrating the rendering-range limitation updating process.

When starting the process, the rendering processing means 104 updates the request limitation 116*a* stored in the rendering range limitation storage unit 116 in accordance with a condition specified by the rendering request (in step S1401).

For example, when the rendering request represents that a rectangular region including an upper left coordinate (1, 1) and a lower right coordinate (10, 10) which are diagonally arranged is set as a rendering range, the rectangular region is stored as the request limitation 116*a*.

The rendering-range limitation updating process has been described hereinabove.

Next, a rendering termination process shown in FIG. 4 will be described. In the rendering termination process, the process performed by the rendering processing means 104 is terminated.

Figure 7:
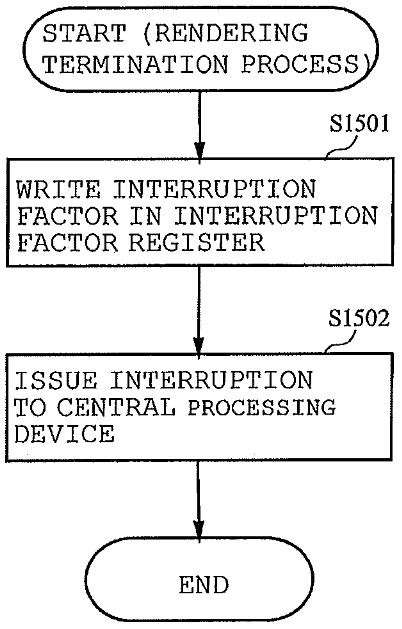
FIG. 7 is a flowchart illustrating a rendering termination process shown in FIG. 4.

FIG. 7 is a flowchart illustrating an operation of the rendering termination process.

When the rendering termination process is started, the interruption factor is written to the interruption factor register 108 (in step S1501). For example, when the rendering process is terminated due to generation of a "termination factor x", the "termination factor x" is written to the interruption factor register 108. The interruption factor written to the interruption factor register 108 may be arbitrarily determined. Although the rendering request group 200 shown in FIG. 3 includes rendering requests 203 and 206 representing "rendering termination", different termination factors may be stored as interruption factors.

Then, an interruption is issued to the central processing means 101 (in step S1502) and the process is terminated.

The central processing means 101 performs a required interruption process in response to the issuance of the interruption, and a reason of the issuance of the interruption can be recognized with reference to the interruption factor register 108.

The operation of the rendering termination process has been described hereinabove.

Referring back to FIG. 2, the operation performed by the rendering processing means 104 is continued.

(Step S21 to Step S23)

The rendering processing means 104 successively executes the rendering request processes in accordance with content of the rendering request. After the rendering termination process is performed, the operation is stopped.

(Step S24 to Step S26)

When the starting command is written to the start/end instruction register 107 again, the rendering request process is started in response to the rendering request stored in the rendering request region 121.

That is, after the starting command is written to the start/end instruction register 107, the rendering processing means 104 performs the process in response to the rendering request independently from the central processing means 101.

(3) Operation of Liquid Crystal Display Unit 123

Next, operation of the liquid crystal display unit 123 will be described.

(Step S31 and Step S32)

The liquid crystal display unit 123 successively reads rendering data specified by display addresses of the display address register 124 from the rendering result region 122, and obtains the coordinate values and the color values used to emit light from the liquid crystal included in the liquid crystal screen 125 so that the liquid crystal of the liquid crystal screen 125 emits light. By this, a diagram or an image is displayed in the liquid crystal screen 125.

As described above, the central processing means 101 executes the display program and writes the rendering request to the storage means 118, and in response to the rendering request, the rendering processing means 104 executes the rendering request process and writes a rendering result to the storage means 118. Then, in accordance with the rendering result, the liquid crystal display unit 123 performs display on the liquid crystal screen 125. In this series of processes, the liquid crystal screen 125 performs screen display.

The operation performed when the screen display is performed on the liquid crystal screen 125 has been briefly described.

Next, a concrete example of the rendering request and an example of rendering performed in response to the rendering request will be described.

Figure 8:
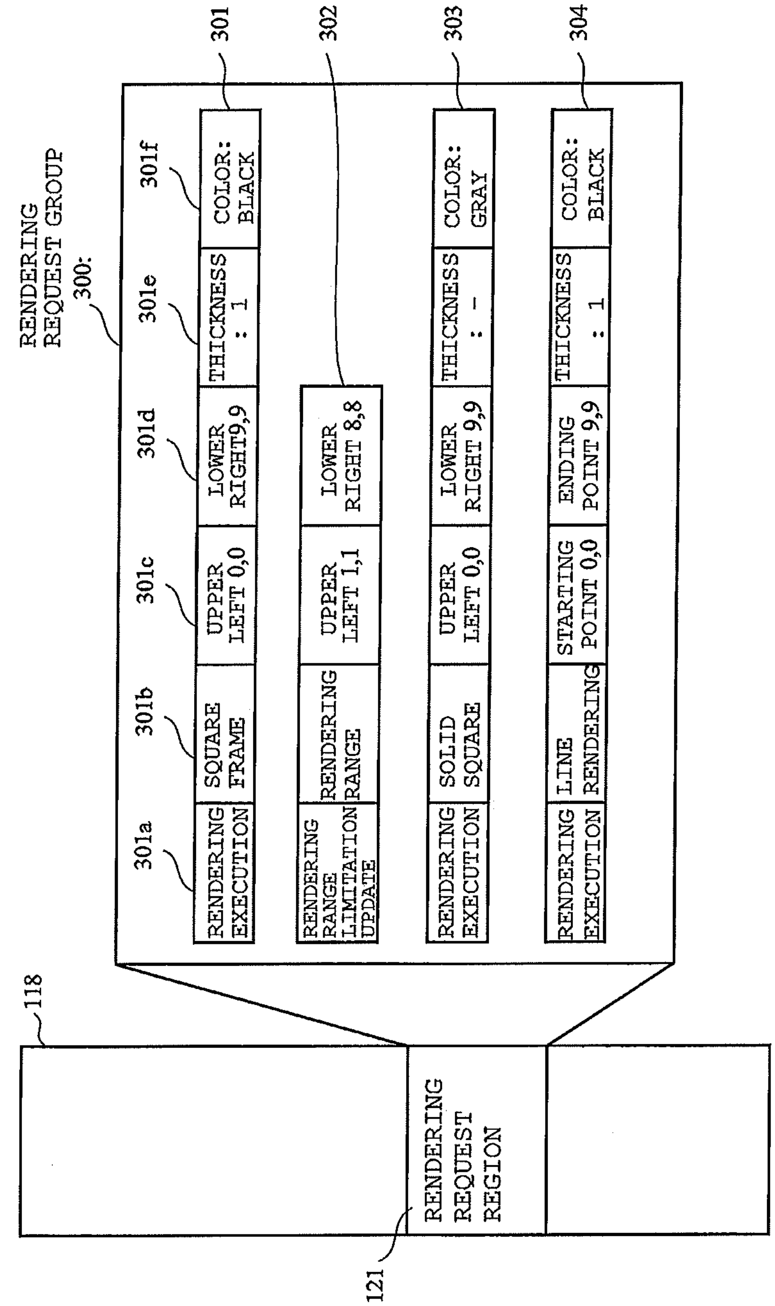
FIG. 8 is a diagram illustrating an exemplar configuration of a rendering request.

FIG. 8 is a diagram illustrating a configuration of a rendering request group 300 stored in the rendering request region 121, and the rendering request group 300 includes rendering requests 301 to 304.

Figure 9:
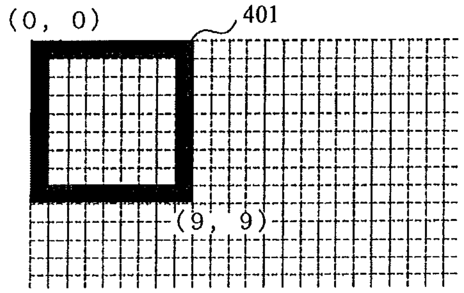
FIG. 9 includes diagrams illustrating exemplar display performed in response to the rendering request shown in FIG. 8.
Figure 9:
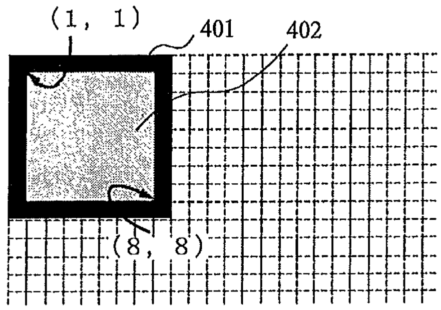
Figure 9:
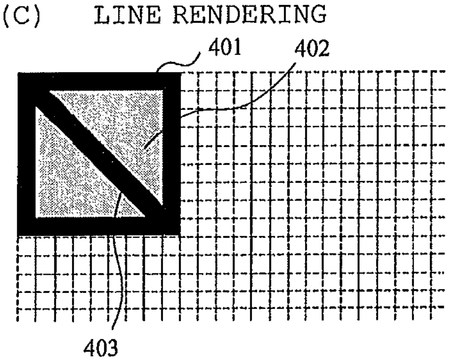

Furthermore, FIG. 9 includes diagrams illustrating content of the rendering result region 122 rendered in accordance with the rendering request group 200 shown in FIG. 8. Note that, since the rendering result region 122 corresponds to a storage space, the content of the rendering result region 122 is shown as a display image displayed in the liquid crystal screen 125 in FIG. 9 for simplicity of a description.

Hereinafter, the description will be made on the basis of FIGS. 8 and 9 with reference to FIG. 5.

In FIG. 8, the rendering request group 300 includes the rendering requests 301 to 304. The rendering requests 301, 303, and 304 are used to perform "rendering execution" and the rendering request 302 is used to perform "rendering-range limitation update".

Each of the rendering requests 301 to 304 includes various parameters. Taking the rendering request 301 as an example, the parameters include a command type 301*a*, a rendering function type 301*b*, an upper-left coordinate 301*c*, a lower-right coordinate 301*d*, a line thickness 301*e*, and a rendering color 301*f*. Content of the parameters depends on content of a rendering request.

The rendering request 301 is issued to perform rendering such that a square frame (301*b*) having an upper-left coordinate (0, 0) (301*c*) and a lower-right coordinate (9, 9) (301*d*) which are diagonally arranged is rendered with a line thickness of 1 (301*e*) and a color of black (301*f*).

A primary section of a rendering execution process performed based on the rendering request 301 will be mainly described with reference to FIG. 5.

In FIG. 5, coordinates (0, 0) used to render the square frame are calculated (in step S1303), and it is determined whether the coordinates are included in the rendering limitation 116*b* or not (in step S1304).

It is assumed here that a rectangular region with the upper-left coordinates (0, 0) and a lower-right coordinates (320, 240) being a diagonal is specified as the rendering limitation 116*b*. Since the coordinates (0, 0) are included in the rendering limitation 116*b*, the process proceeds to step S1305 and it is determined whether the coordinates (0, 0) are included in the requested limitation 116*a* (in step S1305).

It is assumed here that the rectangular region including the upper-left coordinate (0, 0) and a lower-right coordinate (320, 240) which are diagonally arranged is specified as the request limitation 116*a*. Since the coordinate (0, 0) is included in the request limitation 116*a*, the process proceeds to step S1306 where color values of the coordinate (0, 0) is changed (in step S1306), a rendering availability state is changed (in step S1307), and a next rendering coordinate (1, 0) is calculated (in step S1308), and thereafter, the process returns to step S1302.

Thereafter, the process from step S1303 to step S1308 is repeatedly performed on all coordinates included in the square frame. After the process is performed on all the coordinates included in the square frame, that is, the rendering termination condition is satisfied (in step S1302), the process proceeds to step S1309 where the rendering availability state is checked (in step S1309). Since the rendering availability state is changed in step S1307, and therefore, is not the initial state, the determination is negative in step S1309 and the rendering execution process is terminated (in step S1313).

FIG. 9(A) shows a result of the rendering performed in response to the rendering request 301. As shown in the Fig., a square frame 401 including the upper-left coordinate (0, 0) and the lower-right coordinate (9, 9) which are diagonally arranged is rendered. Note that, although ruled lines are shown in FIG. 9 in order to easily recognize the coordinates, the ruled lines are not shown in practice.

Furthermore, the rendering request 302 shown in FIG. 8 corresponds to "rendering range limitation update" in which a rectangular region including an upper-left coordinate (1, 1) and a lower-right coordinate (8, 8) which are diagonally arranged is set as the request limitation 116*a*. A detailed process is the same as that described hereinabove. A result of the rendering performed by the rendering processing unit 110 is restricted by the request limitation 116*a*, and coordinates which are not included in the request limitation 116*a* are not subjected to the rendering. Note that, at a time when the rendering request 302 is executed, the content of the rendering result region 122 is not changed.

Furthermore, the rendering request 303 shown in FIG. 8 is issued to paint a rectangular region including an upper-left coordinate (0, 0) and a lower-right coordinate (9, 9) which are diagonally arranged with gray.

An important section of a rendering execution process performed in response to the rendering request 303 will be mainly described with reference to FIG. 5.

In FIG. 5, the coordinate (0, 0) used to render a solid square is calculated (in step S1303), and it is determined whether this coordinate is included in the rendering limitation 116*b* or not (in step S1304). Since the coordinate (0, 0) is included in the rendering limitation 116*b*, the process proceeds to step S1305 where it is determined whether the coordinate (0, 0) is included in the request limitation 116*a* or not (in step S1305). Since the coordinate (0, 0) is out of the request limitation 116*a* updated by a rendering request 202, the process proceeds to step S1308 where a next rendering coordinate (1, 0) is calculated (in step S1308) and the process returns to step S1302. That is, the coordinate (0, 0) is not rendered in the rendering result region 122.

Thereafter, the process from step S1303 to step S1308 is repeatedly performed on all coordinates included in the solid square. After the process is performed on all the coordinates included in the solid square, that is, the rendering termination condition is satisfied (in step S1302), the process proceeds to step S1309 where the rendering availability state is checked (in step S1309). Although some coordinates including the coordinate (0, 0), are not to be subjected to the rendering due to the limitation of the request limitation 116*a*, the coordinates included in the rectangular region including an upper-left coordinate (1, 1) and a lower-right coordinate (8, 8) which are diagonally arranged are subjected to the rendering. Therefore, the rendering availability state is not the initial state, and accordingly, the determination is negative in step S1309 and the rendering execution process is terminated (in step S1313).

FIG. 9(B) shows a result of rendering performed in response to the rendering request 303. In FIG. 9(B), a solid square 402 rendered in response to the rendering request 303 is hatched. Although the rendering request 303 specifies the upper-left coordinate (0, 0) and the lower-right coordinate (9, 9), only a rectangular region including an upper-left coordinate (1, 1) and a lower-right coordinate (8, 8) which are arranged at opposing corners is painted due to the limitation of the request limitation 116*a* regarding the rendering request 302 and the square frame 401 is not overwritten.

Furthermore, the rendering request 304 shown in FIG. 8 is issued to perform rendering of a line including a starting point (0, 0) and an ending point (9, 9) which are arranged at opposing ends with a line thickness of 1 and a color of black.

A rendering execution process in response to the rendering request 304 is performed in accordance to the process shown in FIG. 5 similarly to the process described above.

FIG. 9(C) shows a result of the rendering performed in response to the rendering request 304. As shown in the Fig., although the rendering request 304 specifies rendering of the line including the starting point (0, 0) and the ending point (9, 9) which serve as opposing ends, the limitation of the request limitation 116*a* regarding the rendering request 302 is applied. Therefore, only a line 403 including a starting point (1, 1) and an ending point (8, 8) which serve as opposing ends is rendered, and the coordinates (0, 0) and (9, 9) are not overwritten.

Next, examples of another rendering request and another rendering process performed in response to the rendering request will be described in detail. Here, a case where a rendering process is not performed in response to a rendering request will be described as an example.

Figure 10:
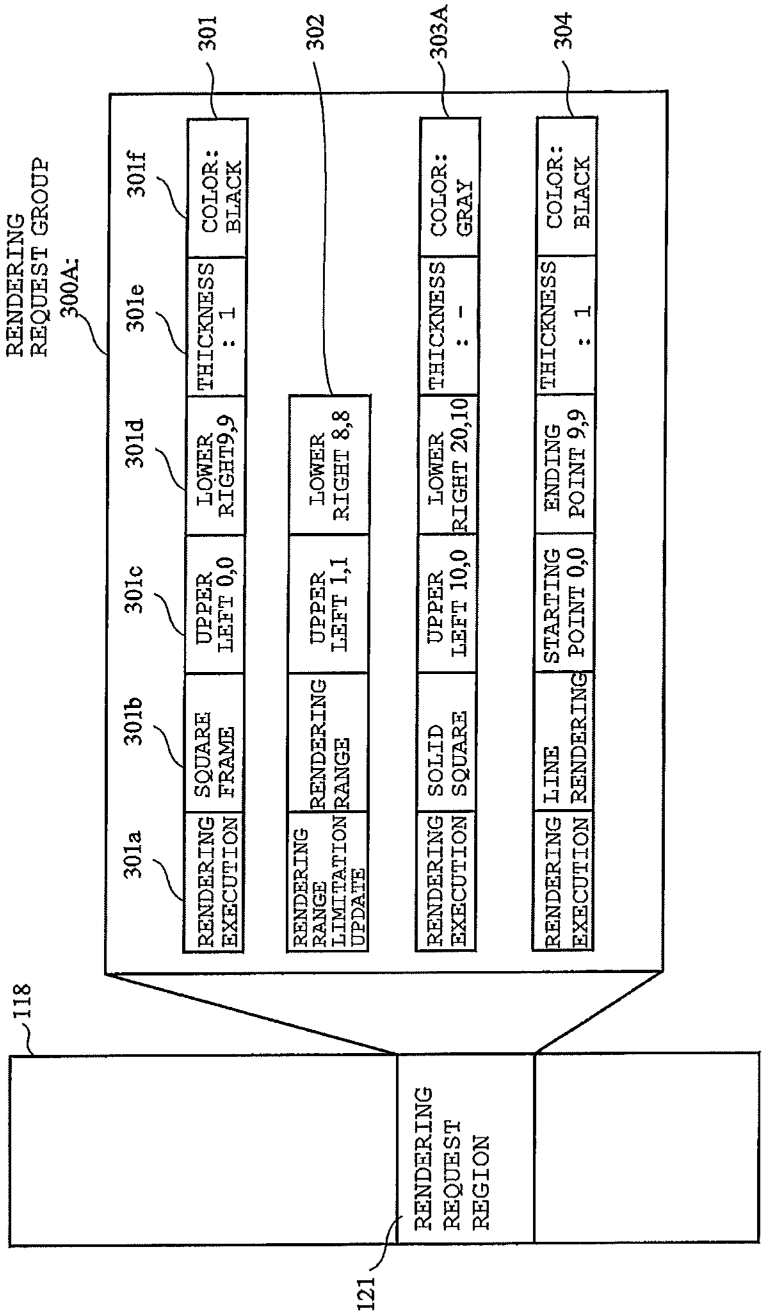
FIG. 10 is a diagram illustrating an exemplar configuration of another rendering request.
Figure 11:
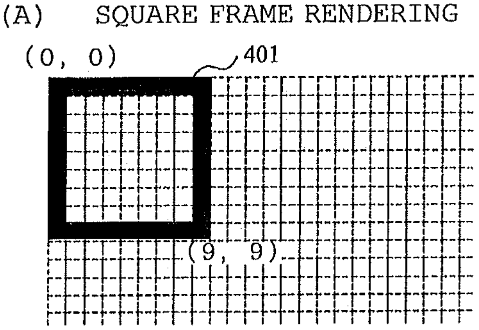
FIG. 11 includes diagrams illustrating exemplar display performed in response to the rendering request shown in FIG. 10.
Figure 11:
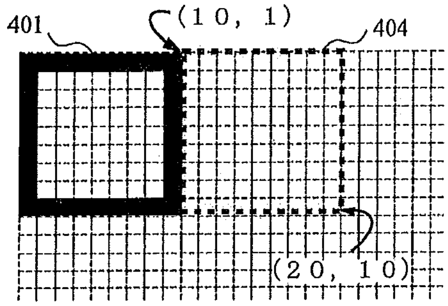

FIG. 10 is a diagram illustrating a configuration of a rendering request group 300A stored in the rendering request region 121. Only a rendering request 303A is different from the rendering request shown in FIG. 8 described above, and other configurations are the same as those shown in FIG. 8. Furthermore, FIG. 11 includes diagrams illustrating content of the rendering result region 122 rendered in response to the rendering request group 300A shown in FIG. 10. Hereinafter, portions different from those shown in FIGS. 8 and 9 will be mainly described.

Rendering execution process is performed based on the rendering requests 301 and 302 as described above.

FIG. 11(A) shows rendering results obtained after the rendering requests 301 and 302 are executed. As with the case of FIG. 9(A), a square frame 401 is rendered.

Furthermore, as the request limitation 116*a*, a rectangular region with the upper-left coordinates (1, 1) and the lower-right coordinates (8, 8) being the opposing corner is specified.

A rendering request 303A shown in FIG. 10 is issued to paint with gray a rectangular region including an upper-left coordinate (10, 0) and a lower-right coordinate (20, 10) which are diagonally arranged.

An important portion of a rendering execution process performed in response to the rendering request 303A will be mainly described.

In FIG. 5, the coordinate (10, 0) is calculated as a coordinate used to render a solid square (in step S1303), and it is determined whether this coordinate is included in the rendering limitation 116*b* of the rendering result region or not (in step S1304). Since the coordinate (10, 0) is included in the rendering limitation 116*b*, the process proceeds to step S1305 where it is determined whether the coordinate (10, 0) is included in the request limitation 116*a* or not (in step S1305). Here, since the coordinate (10, 0) is out of the request limitation 116*a*, the process proceeds to step S1308 where a next rendering coordinate (11, 0) is calculated (in step S1308), and thereafter, the process returns to step S1302.

Thereafter, the process from step S1303 to step S1308 is repeatedly performed on all coordinates included in the solid square. After the process performed on all the coordinates included in the solid square is terminated, that is, the rendering termination condition is satisfied (in step S1302), the process proceeds to step S1309 where the rendering availability state is checked (in step S1309).

Here, all the coordinates included in the rectangular region including the upper-left coordinate (10, 0) and the lower-right coordinate (20, 10) which are diagonally arranged and which are specified by a rendering request 203A are located out of the request limitation 116*a*. In other words, the rectangular region to be subjected to the rendering in response to the rendering request 203A does not intersect with the region of the request limitation 116*a*.

Accordingly, rendering is not performed and the rendering availability state remains as the initial state. Therefore, the determination is affirmative in step S1309, "out of rendering" is set as the interruption factor in the interruption factor register 108 (in step S1310), an interruption request is issued to the central processing means 101 (in step S1311), and the rendering execution process is interrupted (in step S1312). Note that, since the rendering execution process is interrupted, a rendering process is not executed in response to the rendering request 304 (shown in FIG. 10).

A rendering result obtained after the process performed in response to the rendering request 303A is shown in FIG. 11(B). In FIG. 11(B), a rectangular region 404 to be the solid square in response to the rendering request 303A is virtually shown by a dotted line. As shown in FIG. 11(B), since the rectangular region 404 is out of the rectangular region specified by the request limitation 116*a*, the gray painting is not performed, and as a result, content of the rendering performed on the rendering result region 122 is the same as that shown in FIG. 11(A).

Note that, although the case where the rendering range of the rendering request 303A is out of the request limitation 116*a* has been described above, also when a case where the rendering range of the rendering request 303A is out of the request limitation 116*b*, the process in FIG. 5 can be performed. Furthermore, when the interruption factor is written in step S1310 of FIG. 5, the interruption factor to be written may be determined depending on whether the rendering region is located out of the request limitation 116*a* or out of the rendering limitation 116*b*.

As described above, the state display device 1 according to Embodiment 1 includes the rendering processing means 104 serving as dedicated hardware which executes the rendering process separately from the central processing means 101 which controls the entire state display device 1. Accordingly, a processing load applied to the central processing means 101 at the time of the rendering process can be reduced. Furthermore, since the rendering processing means 104 performs the rendering process, the high-speed rendering process is realized.

Furthermore, the rendering processing means 104 performs the rendering process independently from the central processing means 101 in a period of time from when the starting command is written to the start/end instruction register 107 to when the rendering termination process is performed in response to the rendering request. Therefore, in the central processing means 101, processing resources are not occupied by the rendering process performed by the rendering processing means 104, and accordingly, the processing resources can be sufficiently assigned to processes of controlling a main control application and the like. Consequently, original functions of the state display device 1 and functions of an apparatus including the state display device 1 can be executed at high speed.

Furthermore, since the rendering processing means 104 terminates the rendering process in response to the "rendering termination" request serving as the rendering request, the rendering processing means 104 terminates the rendering process independently from the central processing means 101. On the other hand, the central processing means 101 is not required to monitor the rendering process performed by the rendering processing means 104 and is not required to instruct the rendering processing means 104 to terminate the rendering process, and accordingly, a processing load caused by the monitoring and issuance of the instruction to the rendering processing means 104 is reduced.

Furthermore, in the rendering termination process performed in response to the "rendering termination" request, the termination factor is stored in the interruption factor register 108 as the interruption factor. Since an arbitrary interruption factor can be stored, the central processing means 101 recognizes a reason of the interruption of the rendering process of the rendering processing means 104. For example, when an interruption factor representing that the rendering processing means 104 is merely in a temporary halt state is stored in the interruption factor register 108, the central processing means 101 recognizes that the rendering processing means 104 has temporarily stopped the process. Moreover, when an interruption factor representing that the entire process is terminated is stored in the interruption factor register 108, the central processing means 101 recognizes that the entire process is completed.

Furthermore, since the rendering request may be stored in the storage means 118 in advance, when the rendering request is repeatedly performed, the process can be efficiently performed. That is, when an FIFO (First In First Out) buffer is used to consecutively issue rendering requests to a graphic processor, for example, all the rendering requests should be stored in the FIFO buffer. Accordingly, rendering requests to be repeatedly executed are stored in the FIFO buffer for the number corresponding to repetitions. However, according to the state display device 1 of Embodiment 1, the rendering requests to be repeatedly performed is merely stored in the rendering request region 121 as a set of a rendering request group. Then, only by writing the starting command to the start/end instruction register 107, the rendering processing means 104 repeatedly executes the rendering request group stored in the rendering request region 121.

Furthermore, when the rendering of coordinates are not performed in the rendering execution process (in FIG. 5), the interruption factor is written to the interruption factor register 108, and in addition, the interruption request is issued to the central processing means 101. Accordingly, the central processing means 101 recognizes an occurrence of an error. Consequently, the central processing means 101 can distinguish whether the display is not performed on purpose or the display is not performed due to an error. When the display is not performed due to an error, the central processing means 101 performs an appropriate process.

Furthermore, the request limitation 116*a* and the rendering limitation 116*b* are provided so that the central processing means 101 can recognize that rendering of coordinates is not performed at all by reason of which limitation is out of range. Accordingly, the central processing means 101 can perform an appropriate process as needed.

Furthermore, when an image displayed on the screen is moved little by little in accordance with an operation performed by an operator, that is, when animated display is performed, a rendering request for moving a position of the image is repeatedly executed. In this case, in the state display device 1 of Embodiment 1, a plurality of rendering request groups (a rendering execution request and a rendering termination request) to be used until transfer of the position of the image is terminated are stored in the storage means 118 in advance. Then, the central processing means 101 successively issues starting commands with a predetermined interval (0.1 second, for example) so as to cause the rendering processing means 104 to successively perform rendering processes. After termination of the processes performed in accordance with the rendering request groups, the rendering termination factors have been stored in the interruption factor register 108. By this, even when rendering processes are consecutively performed, that is, when the animated display is performed, for example, the main process performed by the central processing means 101 is hardly interrupted. In general, interruption processes of the central processing means 101 is made to be minimized so that high-speed responses are realized and the main process is not disturbed. Under this circumference, the interruption factor register 108 can independently perform an appropriate rendering process without referring to a state of the main process, and accordingly, this is considerably effective for the central processing means 101 which does not enough power to operate at high speed.

Note that, in Embodiment 1, the case where the rendering range limitation storage unit 116 includes the request limitation 116*a* specified by the rendering request and the rendering limitation 116*b* calculated in accordance with the rendering result region 122 has been described as an example. Alternatively, when a displayable range of the liquid crystal screen 125 does not coincide with a size of the rendering result region 122, the displayable range of the liquid crystal screen 125 may be independently stored as a rendering range in the rendering range limitation storage unit 116. Furthermore, the rendering availability state is preferably stored in the rendering availability state storage unit 117 for each rendering range stored in the rendering range limitation storage unit 116.

Furthermore, in step S1307 of FIG. 5 according to Embodiment 1, only when a rendering coordinate is included in the rendering limitation 116*b* (in step S1304) and included in the request limitation 116*a* (in step S1305), value stored in the rendering availability state storage unit 117 is changed (in step S1307). That is, in Embodiment 1, the first rendering availability variable and the second rendering availability variable according to the present invention are represented by single value. However, a rendering availability state of the rendering limitation 116*b* and a rendering availability state of the request limitation 116*a* may be separately stored, and in this case, more accurate control can be performed.

Embodiment 2

In Embodiment 2, a case where, when a plurality of rendering request regions are arranged separately from one another in storage means, rendering requests stored in the rendering request regions are consecutively executed will be described as an example. Note that, in Embodiment 2, portions different from those of Embodiment 1 will be mainly described.

Figure 12:
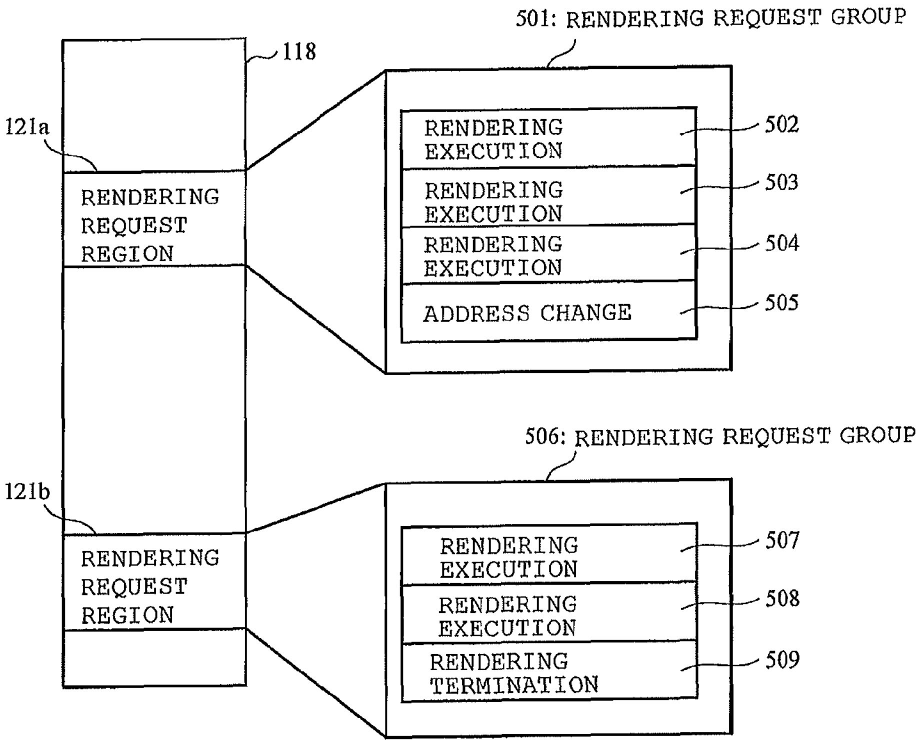
FIG. 12 is a diagram illustrating exemplar configurations of rendering request regions according to Embodiment 2 of the present invention.

FIG. 12 is a diagram illustrating configurations of rendering request regions 121*a* and 121*b* according to Embodiment 2. In FIG. 12, the rendering request regions 121*a* and 121*b* are arranged separately from each other in storage means 118.

The rendering request regions 121*a* and 121*b* include rendering request groups 501 and 506, respectively. The rendering request group 501 includes rendering requests 502 to 505. The rendering requests 502 to 504 are commands for requesting execution of rendering of a square frame and the like. On the other hand, the rendering request region 506 includes rendering requests 507 to 509. The rendering requests 507 and 508 are commands for requesting execution of rendering, and the rendering request 509 is a command for requesting termination of the rendering.

Furthermore, the rendering request 505 is a command for replacing an instruction address stored in an instruction address register 106 by an address where a rendering request to be processed next is stored, and is a characteristic of Embodiment 2. The rendering request 505 has the instruction address which is a destination of the changing as a parameter. When the instruction address of the instruction address register 106 specified the rendering request 505, rendering processing means 104 performs an address changing process (which will be described hereinafter).

Figure 13:
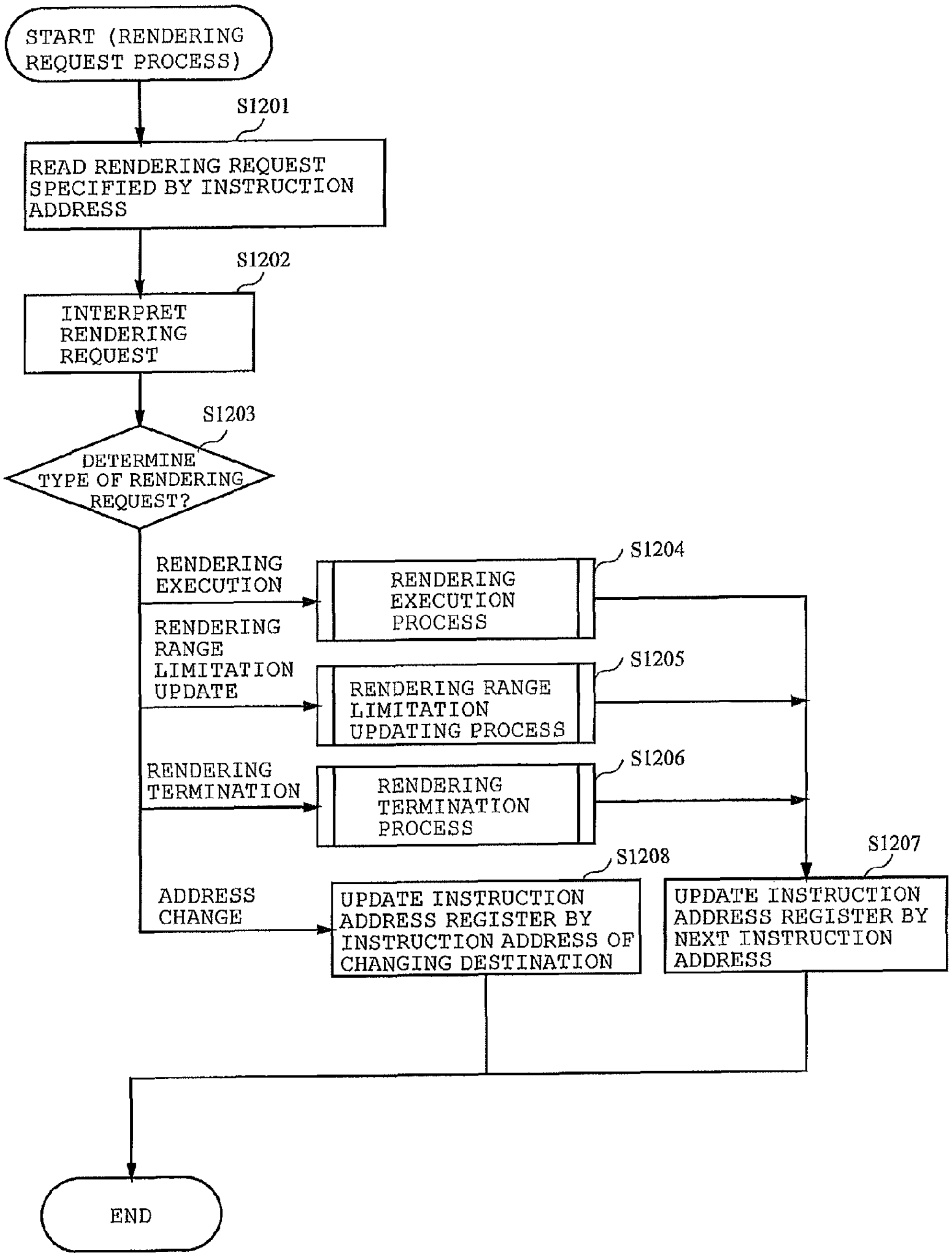
FIG. 13 is a flowchart illustrating a rendering request process according to Embodiment 2 of the present invention.

FIG. 13 is a flowchart illustrating a rendering request process performed by the rendering processing means 104 according to Embodiment 2 of the present invention.

FIG. 13 is substantially the same as FIG. 4 described above except for step S1208. In step S1208, when a rendering request corresponds to “address change”, the instruction address of the instruction address register 106 is replaced by an instruction address of a destination of the change. The instruction address of the destination of the change is supplied in response to the rendering request 505 representing “address change” and is where a rendering request to be processed next is stored.

Accordingly, when the rendering request process is executed again, the rendering request specified by the instruction address changed in step S1208 is executed.

Figure 14:
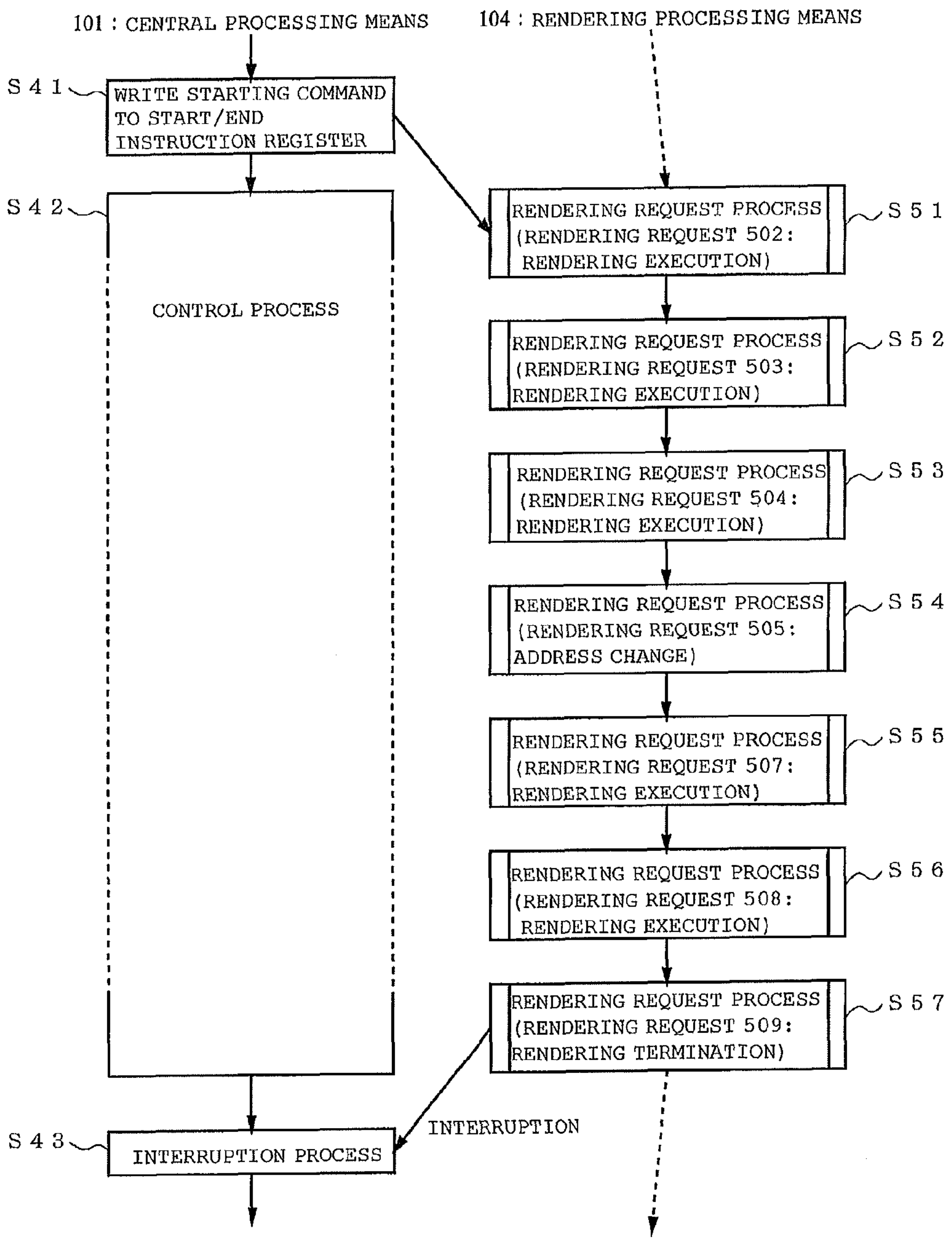
FIG. 14 is a flowchart illustrating operation of a display device according to Embodiment 2 of the present invention.

FIG. 14 is a flowchart illustrating an operation performed in accordance with the rendering request groups 501 and 506 shown in FIG. 12. In FIG. 14, an operation of central processing means 101 and an operation of the rendering processing means 104 will be described. Note that the rendering request groups 501 and 506 have been written in the rendering request regions 121*a* and 121*b*, respectively.

(1) Operation of Central Processing Means 101

The central processing means 101 writes a starting command to a start/end instruction register 107 (in step S41). Thereafter, the central processing means executes a required control process in accordance with a device control program (in step S42). Subsequently, when the rendering processing means 104 issues an interruption request, the central processing means 101 interrupts the process of step S42 and performs a predetermined interruption process (in step S43). That is, in a period from when the starting command is written to the start/end instruction register 107 to when the interruption request is issued, the central processing means performs the control process independently from the rendering processing means 104.

(2) Operation of Rendering Processing Means 104

Next, the operation of the rendering processing means 104 will be described.

When the starting command is written to the start/end instruction register 107, the rendering processing means 104 performs a rendering request process in accordance with a rendering request included in a rendering request region 121 specified by an instruction address stored in the instruction address register 106 (in step S51). Assuming that the instruction address register 106 stores an instruction address representing the rendering request 502, a process corresponding to the rendering request 502 is executed.

Subsequently, processes corresponding to the rendering requests 503 and 504 are performed (in step S52 and step S53).

Next, an address changing process is performed in response to the rendering request 505 representing “address change” (in step S54). As shown in FIG. 13, in the address changing process, an address where the rendering request 507 to be processed next is stored is stored in the instruction address register 106. Accordingly, in the next rendering request process, the rendering request 507 which is independent from the rendering request group 501 is executed.

Subsequently, rendering request processes are performed in response to the rendering requests 507 and 508 (in step S55 and step S56), and thereafter, a rendering termination process is performed in response to the rendering request 509 representing "rendering termination". Then, the rendering processing means 104 issues the interruption request to the central processing means 101 in the rendering termination process (in step S57), and terminates the process.

As described above, according to Embodiment 2, the rendering request representing "address change" is provided as a rendering request, and the instruction address of the instruction address register 106 is updated in accordance with the request representing "address change". Accordingly, by separately arranging rendering request groups in a plurality of regions included in the storage means 118 and providing the rendering request representing "address change" for changing an address to a leading address of the rendering request region 506, the rendering processes corresponding to the rendering requests separately located can be continuously executed. Since a change of an address from the rendering request region 121*a* to the rendering request region 121*b* can be performed independently from the central processing means 101, a processing load applied to the central processing means 101 is not increased.

Furthermore, when a number of rendering requests are required for performing complicated rendering, the rendering requests are arranged in different regions included in the storage means 118 so that a limited region of the storage means 118 is efficiently used.

Furthermore, since the rendering requests can be divided into a plurality of units so that the plurality of units are arranged in the storage means 118, an efficient program configuration for displaying a plurality of screens having common portions and different portions can be attained. That is, rendering requests of the common portions and rendering requests of the different portions are separately stored in the storage means 118, and when the requests are to be executed, the rendering requests of the different portions are issued followed by the requests of the common portions. Since the rendering requests of the common portions are not required to be stored in the storage means 118 in an intersecting manner, a size of the rendering request region 121 can be reduced.

Embodiment 3

In Embodiment 3, portions different from those of the state display device according to Embodiment 1 will be mainly described. A configuration of a state display device according to this embodiment itself is similar to that of the state display device according to Embodiment 1.

In this embodiment, a single rendering request includes a rendering repeat condition, and an example in which rendering processing means 104 repeatedly performs the same rendering process in accordance with the rendering repeat condition will be described.

Figure 15:
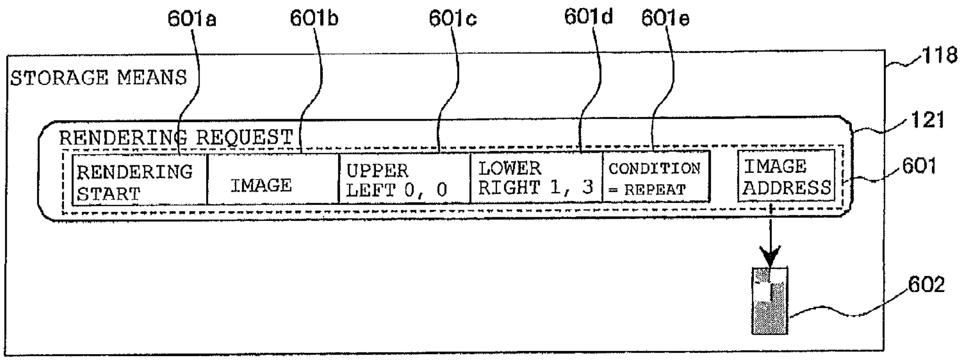
FIG. 15 is a diagram illustrating content of data stored in a rendering request region 121 in a state display device according to Embodiment 3 of the present invention.

FIG. 15 is a diagram illustrating an example of contents of data stored in a rendering request region 121 stored in the state display device according to Embodiment 3 of the present invention.

As shown in FIG. 15, a rendering request 601 is stored in the rendering request region 121 in storage means 118.

The rendering request 601 includes a rendering starting instruction 601*a*, a rendering function instruction (image) 601*b*, a rendering-range upper-left coordinate 601*c*, a rendering-range lower-right coordinate 601*d*, a rendering repeat condition 601*e*, and a rendering image address 601*f*.

When an instruction for rendering image data is issued in accordance with the rendering function instruction (image) 601*b*, an address of image data 602 to be rendered included in a storage means 118 is stored in the rendering image address 601*f*. Furthermore, a repeat condition for repeatedly rendering the same image data is stored in the rendering repeat condition 601*e*.

Figure 16:
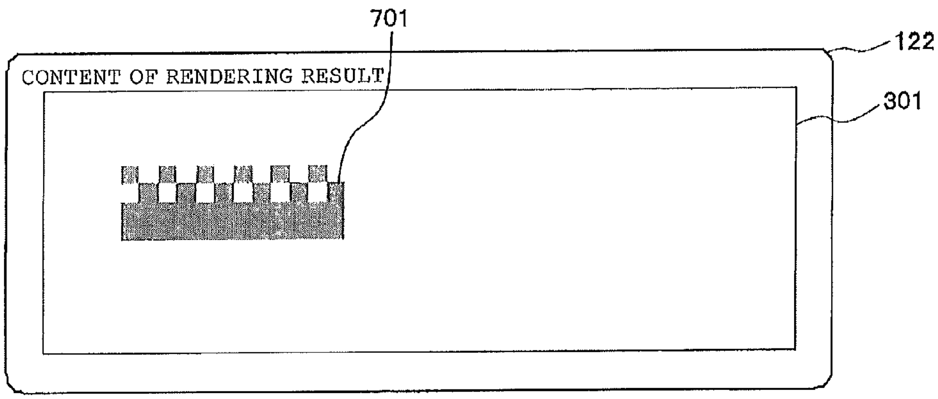
FIG. 16 is a diagram illustrating content of rendered data in a rendering result region 122 in the state display device according to Embodiment 3 of the present invention.

FIG. 16 is a diagram illustrating content of the rendered data included in a rendering result region 122 included in the state display device according to Embodiment 3 of the present invention. FIG. 16 shows the content of the rendering data stored in the rendering result region 122 as a result of execution of the rendering request shown in FIG. 15. For sake of a visual description, a screen image 305 is displayed in a liquid crystal screen 125 instead of the rendering data.

The rendering processing means 104 repeatedly renders the image data 602 in accordance with the rendering repeat condition 601*e*. Here, a case where the image data 602 is repeatedly rendered in a horizontal direction within a rendering range 701 is shown as an example.

Figure 17:
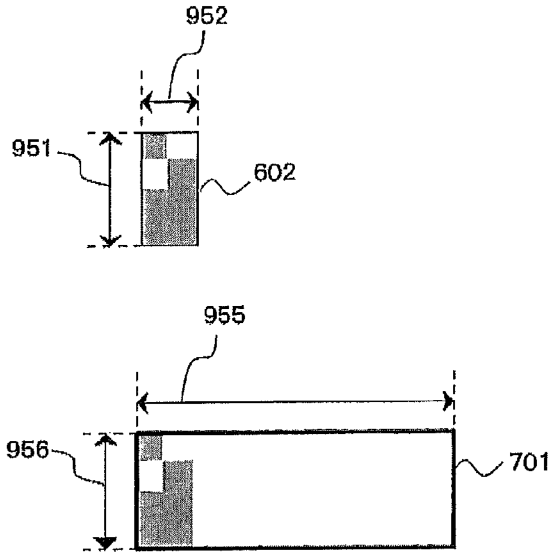
FIG. 17 includes diagrams illustrating a size of image data 602 and a size of a rendering range 701.

FIG. 17 is a diagram illustrating a size of the image data 602 and a size of the rendering range 701.

An image height 951 corresponds to a size of the image data 602 in a vertical direction when the image data is rendered in the liquid crystal screen 125.

An image width 952 corresponds to a size of the image data 602 in a horizontal direction when the image data is rendered in the liquid crystal screen 125.

A rendering width 955 corresponds to a size of the rendering range 701 in the horizontal direction when the rendering range is rendered in the liquid crystal screen 125.

A rendering height 956 corresponds to a size of the rendering range 701 in the vertical direction when the rendering range is rendered in the liquid crystal screen 125. In this example, the rendering height 956 and the image height 951 coincide with each other.

Figure 18:
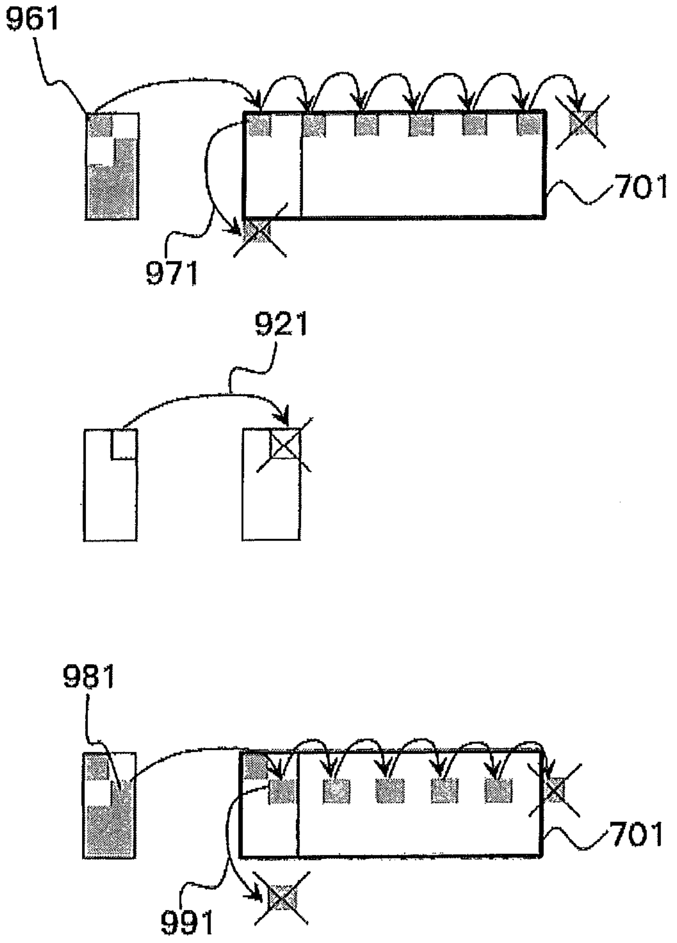
FIG. 18 includes diagrams illustrating a process of repeatedly writing the image data 602 to the rendering result region 122 performed by rendering processing means 104 in the state display device according to Embodiment 3 of the present invention in detail.

FIG. 18 is a diagram illustrating a process of repeatedly writing the image data 602 in the rendering result region 122 performed by rendering processing means 104 included in the state display device according to Embodiment 3 of the present invention in detail.

As shown in FIG. 18, the image data 602 includes small gray rectangular regions 961 and 981, and a large gray rectangular region arranged beneath the small gray rectangular regions 961 and 981. Furthermore, it is assumed that the repetitive process is performed on the individual rectangular regions.

Hereinafter, content of the repetitive process will be described in addition to the correspondence relationship with an address included in the storage means 118.

(1) Address Assignation in Storage Means 118

In the storage means 118, addresses which increases in an ascending order are assigned to the rendering result region 122. The correspondence relationships between the addresses and luminous points of the liquid crystal screen 125 will be described below.

(1.1) An uppermost-left luminous point of the liquid crystal screen 125 corresponds to the smallest address in the rendering result region 122.

(1.2) Hereinafter, luminous points toward the right side of the liquid crystal screen 125 correspond to addresses in the rendering result region 122 in the ascending order.

(1.3) When a luminance point comes to the rightmost end of the liquid crystal screen 125, the next address is assigned to a luminance point located at a leftmost end in a row immediately beneath the processed row by one luminance point.

(1.4) Thereafter, luminance points of one row from left to right correspond to addresses in the rendering result region 122 in the ascending order.

(2) Repeat Range in Horizontal Direction

Next, a horizontal rendering range of the rendering range 701 will be described.

(2.1) Rendering of Rectangular Region 961

The rendering processing means 104 repeatedly writes rendering data used to display the rectangular region 961 into the rendering result region 122. An address of a writing destination is incremented in an ascending order. By this, in the liquid crystal screen 125, rendering is repeatedly performed from left to right. Furthermore, the rendering processing means 104 increments the address of the writing destination in the ascending order in course of the repetitive rendering, and interrupts the repetitive rendering when a position of writing of the address exceeds a position corresponding to a right-end portion of the rendering range 701. This is because, since, among the addresses included in the storage means 118, an address following the address of the right-end portion of the rendering range 701 is assigned to a left-end portion of the rendering range 701, wrong repetitive rendering is performed if the repetitive rendering is continued.

(2.2) Rendering of Rectangular Region 981

The rendering processing means 104 performs repetitive rendering on the rectangular region 981 similarly to the rectangular region 961. Furthermore, as with the repeat condition of the rectangular region 961, the rendering processing means 104 interrupts the repetitive rendering when a writing position corresponding to the writing address exceeds the position corresponding to the right-end portion of the rendering range 701.

(2.3) First Item Common to Rectangular Regions 961 and 981

The rendering processing means 104 interrupts the repetitive rendering performed for each rectangular region when a writing position corresponding to an address of a writing destination exceeds a position corresponding to the right-end portion of the rendering range 701. The addresses included in the storage means 118 are not ended at the right end of the rendering range 701 but continued to the left end thereof. Therefore, a determination as to whether the position corresponding to the right-end portion of the rendering range 701 has been exceeded may be determined using a surplus obtained by dividing a value of an address by a total number of luminous points in the horizontal direction, for example.

(2.4) Second Item Common to Rectangular Regions 961 and 981

Similarly, the rendering processing means 104 interrupts the repetitive rendering when the writing position corresponding to the address of the writing destination exceeds a position corresponding to a right-end portion of the liquid crystal screen 125. This is because the rendering is not allowed to be performed on regions located out of the right end of the liquid crystal screen 125. When a difference between an address obtained at a time when the rendering is started and the address of the writing destination at current time exceeds the number of luminous points in the horizontal direction, the repetitive process is preferably interrupted.

(3) Repetitive Range in Vertical Direction

Next, a rending range in the vertical direction of the rendering range 701 will be described.

(3.1) Rendering of Rectangular Region 961

After the image data 602 is repeatedly rendered in the horizontal direction in a first row, the rendering processing means 104 calculates a position of the repetitive rendering in a second row. In the example shown in FIG. 18, as denoted by an arrow mark 971, a position in the second row where the rectangular region 961 is to be rendered is obtained. Specifically, an address of a writing destination of the rectangular region 961 is incremented until the address is shifted from the position at the left-end portion of the rendering range 701 in the vertical direction by an amount corresponding to the image height 951. As a result of the increment of the writing destination address, when the address is larger than an address corresponding to a lower-right end portion of the rendering range 701, it is determined that the writing position exceeds the rendering range 701. Accordingly, the rendering processing means 104 interrupts the repetitive rendering.

(3.2) Rendering of Rectangular Region 981

The rendering processing means 104 repeatedly renders the rectangular region 981 similarly to the case of the rectangular region 961. That is, after the image data 602 is repeatedly rendered in a first row in the horizontal direction, a repetitive rendering position in a second row is calculated. In the example shown in FIG. 18, as denoted by an arrow mark 991, a position in the second row where the rectangular region 981 is to be rendered is obtained. Furthermore, as with the repeat condition of the rectangular region 961, the rendering processing means 104 interrupts the repetitive rendering when a writing position corresponding to the writing destination address exceeds the position corresponding to the right-lower end portion of the rendering range 701.

(3.3) Item Common to Rectangular Regions 961 and 981

Similarly, the rendering processing means 104 interrupts the repetitive rendering when the writing position corresponding to the writing destination address exceeds a position corresponding to the lower-end portion of the liquid crystal screen 125. This is because the rendering is not allowed to be performed on regions beyond the lower end of the liquid crystal screen 125.

Figure 19:
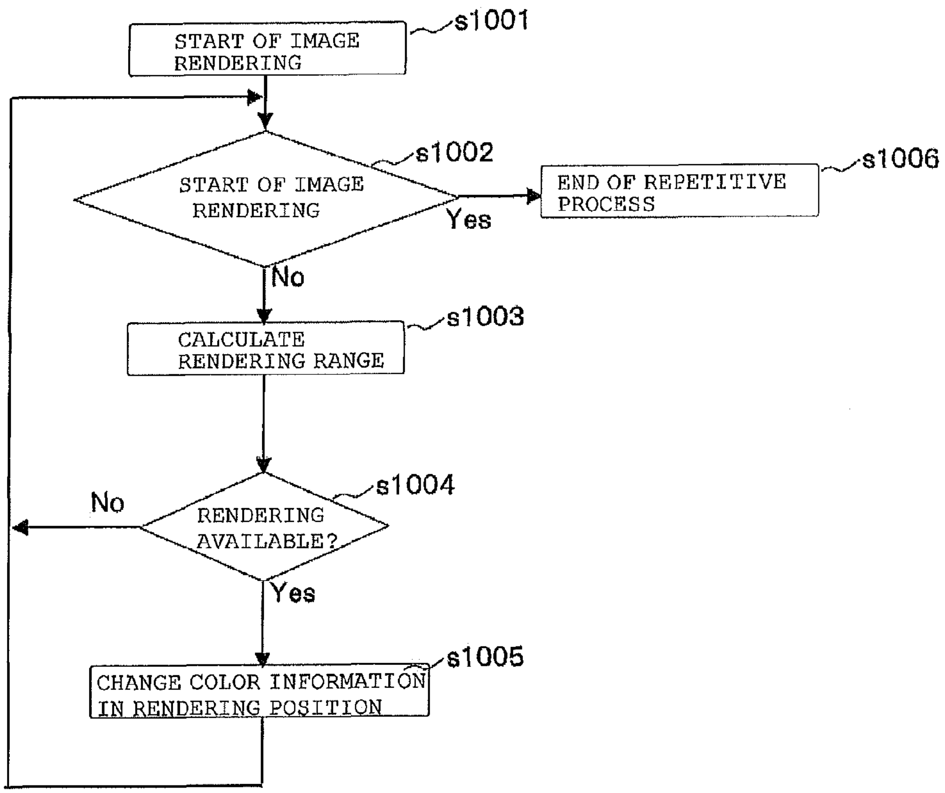
FIG. 19 is a flowchart illustrating a procedure of repetitive rendering performed by the rendering processing means 104 in the state display device according to Embodiment 3 of the present invention.

FIG. 19 is a flowchart illustrating a procedure of the repetitive rendering performed by the rendering processing means 104 included in the state display device according to Embodiment 3 of the present invention. Hereinafter, steps shown in FIG. 19 will be described.

(Step S1001)

The rendering processing means 104 starts a rendering process when a starting instruction is written to the start/end instruction register 107.

(Step S1002)

The rendering processing means 104 determines whether the repetitive rendering is continued or not in accordance with the rendering repeat condition 601*e* using the criterion described with reference to FIG. 18. When the repetitive rendering is to be continued, the process proceeds to step S1003 whereas when the repetitive rendering is to be terminated, the process proceeds to step S1006.

(Step S1003)

The rendering processing means 104 calculates an address which is included in the storage means 118 and which corresponds to a position in which the rendering is to be performed using the method described with reference to FIG. 18.

(Step S1004)

The rendering processing means 104 determines whether the position corresponding to the address calculated in step S1003 is included in the rendering range 701 using the criterion described with reference to FIG. 18. When included, the process proceeds to step S1005, and when not included, the process returns to step S1002 and the same process is repeated.

(Step S1005)

The rendering processing means 104 writes rendering data in the address corresponding to the position in which the rendering is to be performed. For example, the rendering processing means 104 writes color value specified by a rendering request in the address.

(Step S1006)

The rendering processing means 104 terminates the rendering process.

Note that, in the description of the procedure of the repetitive rendering described above, it is assumed that the repetitive rendering is performed in the horizontal and vertical directions. However, the same process may be performed when the repetitive rendering is performed in only one of the horizontal and vertical directions.

As described above, since the rendering processing means 104 repeatedly renders the image data 602 while incrementing the writing destination address in an ascending order in accordance with the rendering repeat condition 601*e*, the rendering processing means 104 operates independently from the central processing means 101 while performing the repetitive rendering. Accordingly, a load applied to the central processing means 101 can be reduced. Furthermore, this is preferable in terms of save of the storage region since the number of rendering requests can be reduced.

Furthermore, the image is repeatedly rendered so that a pattern or the like is formed simply by providing small image data in advance. By this, since the number of rendering calculations can be reduced when compared with a case where the pattern is rendered by line rendering, efficiency of the rendering process can be improved.

Furthermore, the rendering processing means 104 interrupts the repetitive rendering when the writing destination address included in the storage means 118 exceeds the position corresponding to the right end of the rendering range 701 or the liquid crystal screen 125, the rendering processing means 104 can appropriately perform the repetitive rendering.

Furthermore, the rendering processing means 104 interrupts the repetitive rendering when the writing destination address included in the storage means 118 exceeds the position corresponding to the lower end of the rendering range 701 or the liquid crystal screen 125, the rendering processing means 104 can appropriately perform the repetitive rendering.

Note that it is preferable that, when the rendering processing means 104 increments the writing destination address included in the storage means 118 in the ascending order, while the writing destination address has not reached an address corresponding to the upper-left end portion of the rendering range 701, the rendering processing means 104 does not perform writing. If the writing is performed before the writing destination address reaches the address corresponding to the upper-left end portion of the rendering range 701, an image is rendered an upper side or a left side relative to the rendering range 701.

Embodiment 4

In Embodiment 4, a portion different from the state display device according to Embodiment 1 will be mainly described. A configuration of a state display device of this embodiment is the same as that of Embodiment 1.

In this embodiment, an example of an operation of displaying a GUI component such as a button in a liquid crystal screen 125 included in a liquid crystal display unit 123 will be described.

Figure 20:
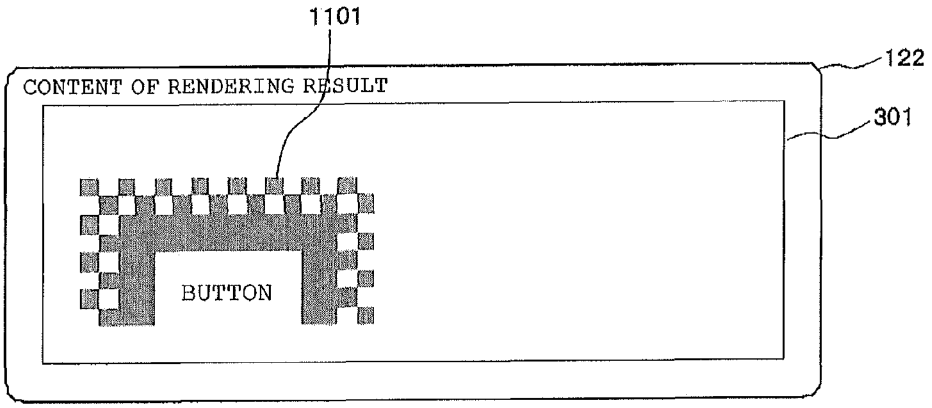
FIG. 20 is a diagram illustrating a button obtained by repeatedly rendering image data in a rendering range 1101 in a state display device according to Embodiment 4 of the present invention.

FIG. 20 is a diagram illustrating a button configured by repeatedly rendering image data in a rendering range 1101 in the state display device according to Embodiment 4 of the present invention. FIG. 20 shows an example of content of rendering data stored in a rendering result region 122, and shows a screen image 305 displayed in the liquid crystal screen 125 instead of the rendering data for sake of a visual description.

As shown in FIG. 20, a gradation image which is an image having a color gradually lightened is repeatedly rendered around the button "button" in the rendering range 1101 included in the screen image 305. In this way, a visual effect is achieved such that the button "button" is surrounded by gradational frame instead of a simple line.

Similarly, by repeatedly rendering image data including two colors around the button "button", a visual effect is achieved such that the button "button" is surrounded by shadow. Furthermore, a visual effect such as shiny highlight can be achieved.

Embodiment 5

In Embodiment 5, portions different from the state display device of Embodiment 1 will be mainly described. The configuration of a state display device of this embodiment is the same as that described in Embodiment 1.

In this embodiment, an example of operations of performing a rendering process from a position on image data by shifting the image data by a surplus obtained by dividing each coordinate value at the upper-left coordinates of the rendering range by the width and the height of the image data will be described.

Figure 21:
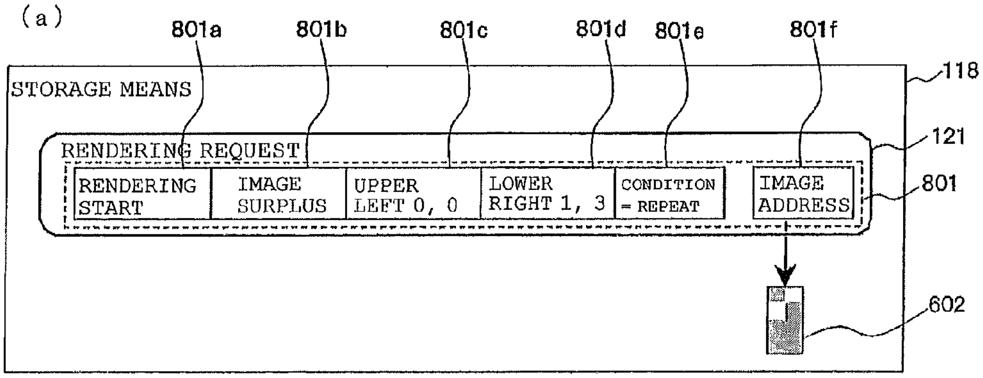
FIG. 21 includes diagrams illustrating content of data stored in a rendering request region 121 in a state display device according to Embodiment 5 of the present invention.
Figure 21:
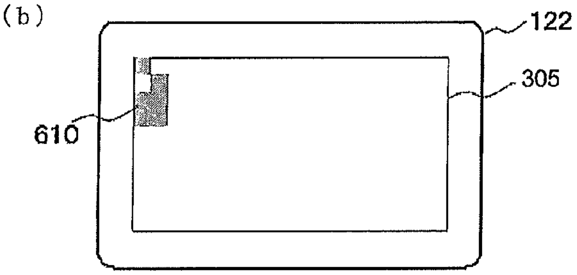

FIG. 21 includes diagrams illustrating content of data stored in a rendering request region 121 included in the state display device according to Embodiment 5 of the present invention.

As shown in FIG. 21(*a*), the rendering request region 121 included in storage means 118 stores a rendering request 801. The rendering request 801 includes a rendering start instruction 801*a*, a rendering function instruction (image surplus) 801*b*, a rendering-range upper-left coordinate 801*c*, a rendering-range lower-right coordinate 801*d*, a rendering repeat condition 801*e*, and a rendering image address 801*f*.

When an instruction for rendering image data using a surplus is issued in accordance with the rendering function instruction (image surplus) 801*b*, an address of image data 602 to be rendered which is included in the storage means 118 is stored in the rendering image address 801*f*. Furthermore, a repeat condition for performing repetitive rendering while the image data is shifted using the surplus is stored in the rendering repeat condition 801*e*.

FIG. 21(*b*) shows content of the rendering data stored in a rendering result region 122 in response to the rendering request 801 shown in FIG. 21(*a*). Here, a screen image 305 is displayed in the liquid crystal screen 125 instead of the rendering data for sake of a visual description. Referring to FIG. 21, a procedure of rendering the image data using the surplus will be described in step (1) to step (5) hereinafter.

(1) As with the operation of Embodiment 1 shown in FIG. 2, rendering processing means 104 obtains a rendering request in accordance with an address stored in an instruction address register 106 and performs a rendering process in response to the rendering request. The rendering processing means 104 obtains the rendering request 801 in accordance with the address stored in the instruction address register 106.

(2) The rendering processing means 104 determines that the image data is to be rendered using a surplus in this rendering process in accordance with the rendering function instruction (image surplus) 801*b*.

(3) The rendering processing means 104 calculates a surplus (hereinafter referred to as "Mod(X)") by dividing a horizontal coordinate (hereinafter referred to as an "X coordinate") at an upper-left coordinate of a rendering range 610 represented by the rendering-range upper-left coordinate 801*c* by a width of the image data 602. Here, since the X coordinate at the upper-left coordinate of the rendering range 610 is "0", the surplus obtained by dividing the coordinate by a value "2" of the width of the image data 602 is represented as follows: Mod (X)=0.

(4) The rendering processing means 104 calculates a surplus (hereinafter referred to as "Mod(Y)") by dividing a vertical coordinate (hereinafter referred to as a "Y coordinate") at the upper-left coordinate of the rendering range 610 represented by the rendering-range upper-left coordinate 801*c* by a height of the image data 602. Here, since the Y coordinate at the upper-left coordinate of the rendering range 610 is "0", the surplus obtained by dividing the coordinate by a value of the height of the image data 602 is represented as follows: Mod (Y)=0.

(5) The rendering processing means 104 displays, at the upper left coordinate of the rendering range 610, pixel data at a position shifted rightward by the surplus Mod(X) and shifted downward by the surplus Mod(Y) from an upper-left pixel data of the image data 602 first, and subsequently, renders data rightward and downward from the upper-left pixel data of the image data 602 onto positions from the upper-left coordinate of the rendering range 610 to the lower-right coordinate of the rendering range 610.

Note that the surpluses Mod(X) and Mod(Y) of all coordinates included in the rendering range 610 may be calculated, and in each of the coordinates, pixel data obtained by shifting the upper-left pixel data of the image data 602 rightward by the surplus Mod(X) and downward by the surplus Mod(Y) may be displayed.

Results of the rendering performed as described above are shown in FIG. 21(*b*). Here, since the surplus of the X coordinate and the surplus of the Y coordinate are "0", and a size of the rendering range 610 is equal to a size of the image data 602, the image data 602 is displayed in the rendering range 610 without change.

Figure 22:
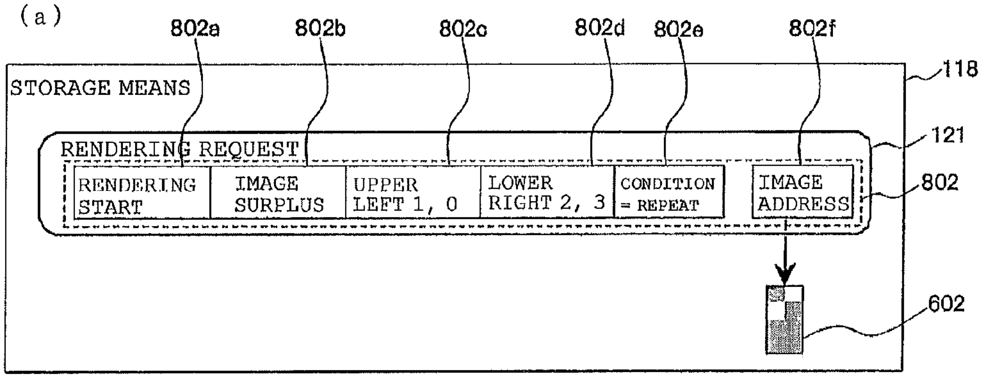
FIG. 22 includes diagrams illustrating content of another data stored in the rendering request region 121 in the state display device according to Embodiment 5 of the present invention.
Figure 22:
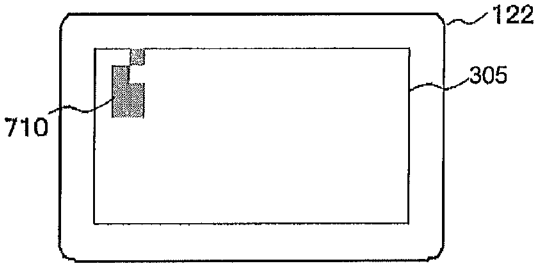

FIG. 22 is a diagram illustrating other contents of data to be stored in the rendering request region 121 included in the state display device according to Embodiment 5 of the present invention.

As shown in FIG. 22(*a*), a rendering request 802 is stored in the rendering request region 121 in the storage means 118.

The rendering request 802 includes a rendering start instruction 802*a*, a rendering function instruction (image surplus) 802*b*, a rendering-range upper-left coordinate 802*c*, a rendering-range lower-right coordinate 802*d*, a rendering repeat condition 802*e*, and a rendering image address 802*f*.

When an instruction for rendering image data using a surplus is issued in accordance with the rendering function instruction (image surplus) 802*b*, an address of the image data 602 which is included in the storage means 118 is stored in the rendering image address 802*f*. Furthermore, a repeat condition for performing repetitive rendering while the image data is shifted using the surplus is stored in the rendering repeat condition 802*e*.

FIG. 22(*b*) shows content of the rendering data stored in the rendering result region 122 in response to the rendering request 801 shown in FIG. 22(*a*). Here, a screen image 305 is displayed in the liquid crystal screen 125 instead of the rendering data for sake of a visual description. Referring to FIG. 22, a procedure of rendering the image data using the surplus will be described in step (1) to step (5) hereinafter.

(1) As with the operation of Embodiment 1 shown in FIG. 2, the rendering processing means 104 obtains a rendering request in accordance with an address stored in an instruction address register 106 and performs a rendering process in response to the rendering request. The rendering processing means 104 obtains the rendering request 802 in accordance with the address stored in the instruction address register 106.

(2) The rendering processing means 104 determines that the image data is to be rendered using a surplus in this rendering process in accordance with the rendering function instruction (image surplus) 802*b*.

(3) The rendering processing means 104 calculates a surplus "Mod(X)" by dividing an X coordinate at an upper-left coordinate of a rendering range 710 represented by the rendering-range upper-left coordinate 802*c* by the width of the image data 602. Here, since the X coordinate at the upper-left coordinate of the rendering range 710 is "1", the surplus obtained by dividing the coordinate by a value "2" of the width of the image data 602 is represented as follows: Mod(X)=1.

(4) The rendering processing means 104 calculates a surplus "Mod(Y)" by dividing a Y coordinate at the upper-left coordinate of the rendering range 710 represented by the rendering-range upper-left coordinate 802*c* by the height of the image data 602. Here, since the Y coordinate at the upper-left coordinate of the rendering range 710 is "0", the surplus obtained by dividing the coordinate by a value "4" of the height of the image data 602 is represented as follows: Mod (Y)=0.

(5) The rendering processing means 104 displays, at the upper left coordinate of the rendering range 710, pixel data at a position shifted rightward by the surplus Mod(X) and shifted downward by the surplus Mod(Y) from an upper-left pixel data of the image data 602 first, and subsequently, renders data rightward and downward from the upper-left pixel data of the image data 602 onto positions from the upper-left coordinate of the rendering range 710 to the lower-right coordinate of the rendering range 710. Here, a pixel data comes to the right end of the image data 602 before coming to the right end of the rendering range 710, and in this case, rendering is further performed starting from pixel data at the left end of the image data 602. That is, when coming to the right end of the image data before coming to the right end of the rendering range, the rendering is performed starting from the left end of the image data whereas when coming to a lower end of the image data before coming to a lower end of the rendering range, the rendering is performed starting from an upper end of the image data.

Note that surpluses Mod(X) and Mod(Y) of all coordinates included in the rendering range 710 may be calculated, and in each of the coordinates, pixel data obtained by shifting pixel data at the upper left of the image data 602 rightward by the surplus Mod(X) and downward by the surplus Mod(Y) may be displayed.

Results of the rendering by the above operations are shown in FIG. 22(*b*). Here, since a surplus of the X coordinate is "1", a surplus of the Y coordinate is "0", and the size of the rendering range 710 is equal to the size of the image data 602, the image data 602 is displayed in the rendering range 710 in a mirror-reversed state.

Figure 23:
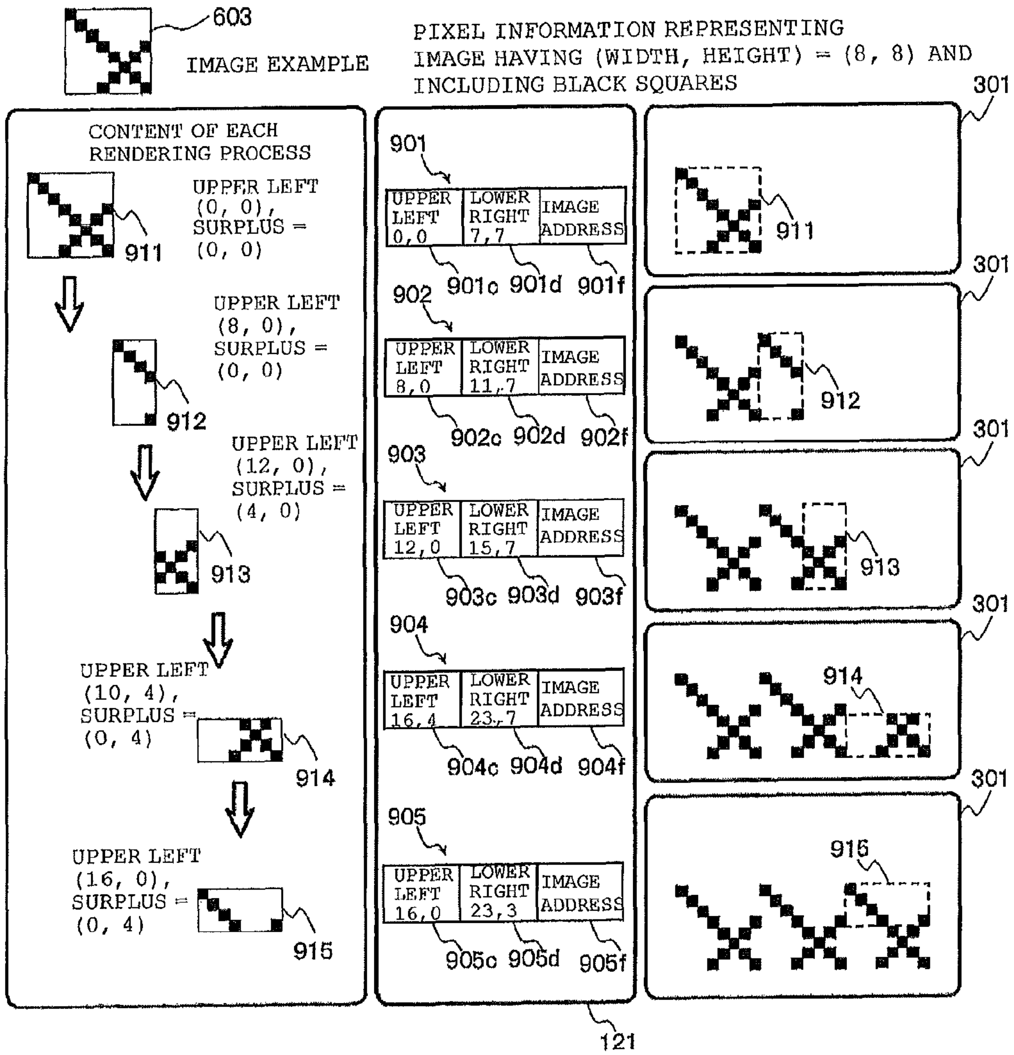
FIG. 23 includes diagrams illustrating content of rendering data in a rendering result region 122 in the state display device according to Embodiment 5 of the present invention.

FIG. 23 includes diagrams illustrating content of another data stored in the rendering result region 122 included in the state display device according to Embodiment 5 of the present invention. Here, a screen image 305 displayed in the liquid crystal screen 125 is shown instead of the rendering data for sake of a visual description.

As shown in FIG. 23, rendering requests 901 to 905 are stored in the rendering request region 121.

The rendering request 901 has a data configuration similar to those of the rendering requests 801 and 802 shown in FIGS. 21 and 22, respectively. However, in FIG. 23, only a rendering-range upper-left coordinate 901*c*, a rendering-range lower-right coordinate 901*d*, and a rendering image address 901*f* are shown. The rendering requests 902 to 905 are similarly configured.

The rendering request 902 includes a rendering-range upper-left coordinate 902*c*, a rendering-range lower-right coordinate 902*d*, and a rendering image address 902*f*.

The rendering request 903 includes rendering-range upper-left coordinate 903*c*, a rendering-range lower-right coordinate 903*d*, and a rendering image address 903*f*.

The rendering request 904 includes rendering-range upper-left coordinate 904*c*, a rendering-range lower-right coordinate 904*d*, and a rendering image address 904*f*.

The rendering request 905 includes rendering-range upper-left coordinate 905*c*, a rendering-range lower-right coordinate 905*d*, and a rendering image address 905*f*.

Referring to FIG. 23, a procedure of rendering of the image data using a surplus performed in response to a plurality of rendering requests will be described in step (1) to step (5) hereinafter. Note that the rendering process performed in response to a plurality of rendering requests is the same as the operations described with reference to FIGS. 2 and 14 of Embodiment 1, and therefore, only operations of the rendering process performed in response to each of the rendering request will be described.

(1) The rendering processing means 104 calculates a surplus Mod(X) by dividing an X coordinate at an upper-left coordinate of a rendering range 911 represented by the rendering-range upper-left coordinate 901*c* by a width of image data 603 and a surplus Mod(Y) by dividing a Y coordinate at the upper-left coordinate of the rendering range 911 represented by the rendering-range upper-left coordinate 901*c* by a height of the image data 603. Here, since the X coordinate at the upper-left coordinate of the rendering range 911 is "0" and the Y coordinate is "0", the surpluses obtained by dividing the coordinate by a value "8" of the width of the image data 603 is represented as follows: Mod(X)=0 and Mod(Y)=0. Then, the rendering processing means 104 displays, at the upper left coordinate of the rendering range 911, pixel data at a position shifted rightward from pixel data at the upper left of the image data 603 by the surplus Mod(X)=0 and shifted downward from the pixel data at the upper left of the image data 603 by the surplus Mod(Y)=0 first, and subsequently, renders data until coming to a lower-right coordinate of the rendering range 911.

(2) The rendering processing means 104 calculates a surplus Mod(X) by dividing an X coordinate at an upper-left coordinate of a rendering range 912 represented by the rendering-range upper-left coordinate 902*c* by the width of image data 603 and a surplus Mod(Y) by dividing a Y coordinate at the upper-left coordinate of the rendering range 912 represented by the rendering-range upper-left coordinate 902*c* by the height of the image data 603. Here, since the X coordinate at the upper-left coordinate of the rendering range 912 is "8" and the Y coordinate is "0", the surpluses obtained by dividing the coordinate by the value "8" of the width of the image data 603 is represented as follows: Mod(X)=0 and Mod(Y)=0. Then, the rendering processing means 104 displays, at the upper left coordinate of the rendering range 912, pixel data at a position shifted rightward from pixel data at the upper left of the image data 603 by the surplus Mod(X)=0 and shifted downward from the pixel data at the upper left of the image data 603 by the surplus Mod(Y)=0 first, and subsequently, renders information until coming to a lower right coordinate of the rendering range 912.

(3) The rendering processing means 104 calculates a surplus Mod(X) by dividing an X coordinate at an upper-left coordinate of a rendering range 913 represented by the rendering-range upper-left coordinate 903*c* by the width of image data 603 and a surplus Mod(Y) by dividing a Y coordinate at the upper-left coordinate of the rendering range 913 represented by the rendering-range upper-left coordinate 903*c* by the height of the image data 603. Here, since the X coordinate at the upper-left coordinate of the rendering range 913 is "12" and the Y coordinate is "0", the surpluses obtained by dividing the coordinate by the value "8" of the width of the image data 603 is represented as follows: Mod(X)=4 and Mod(Y)=0. Then, the rendering processing means 104 displays, at the upper left coordinate of the rendering range 913, pixel data at a position shifted rightward from pixel data at the upper left of the image data 603 by the surplus Mod(X)=4 and shifted downward from the pixel data at the upper left of the image data 603 by the surplus Mod(Y)=0 first, and subsequently, renders information until coming to a lower right coordinate of the rendering range 913.

(4) The rendering processing means 104 calculates a surplus Mod(X) by obtained dividing an X coordinate at the upper-left coordinate of a rendering range 914 represented by the rendering-range upper-left coordinate 904*c* of the rendering request 904 by the width of image data 603 and a surplus Mod(Y) obtained by dividing a Y coordinate at the upper-left coordinate of the rendering range 914 represented by the rendering-range upper-left coordinate 904*c* by the height of the image data 603. Here, since the X coordinate of the upper-left coordinate in the rendering range 914 is "16" and the Y coordinate is "4", the surpluses obtained by dividing the coordinate by the value "8" of the width of the image data 603 is represented as follows: Mod(X)=0 and Mod(Y)=4. Then, the rendering processing means 104 displays, from the upper left coordinates of the rendering range 914, pixel data at a position shifted rightward from pixel data at the upper left of the image data 603 by the surplus Mod(X)=0 and shifted downward by the surplus Mod(Y)=4, and renders until coming to a lower right coordinates of the rendering range 914.

(5) The rendering processing means 104 calculates a surplus Mod(X) by dividing an X coordinate at an upper-left coordinate of a rendering range 915 represented by the rendering-range upper-left coordinate 905*c* by the width of image data 603 and a surplus Mod(Y) by dividing a Y coordinate at the upper-left coordinate of the rendering range 915 represented by the rendering-range upper-left coordinate 905*c* by the height of the image data 603. Here, since the X coordinate at the upper-left coordinate of the rendering range 915 is "16" and the Y coordinate is "0", the surpluses obtained by dividing the coordinate by the value "8" of the width of the image data 603 is represented as follows: Mod(X)=0 and Mod(Y)=4. Then, the rendering processing means 104 displays, at the upper left coordinate of the rendering range 915, pixel data at a position shifted rightward from pixel data at the upper left of the image data 603 by the surplus Mod(X)=0 and shifted downward from the pixel data at the upper left of the image data 603 by the surplus Mod(Y)=4 first, and subsequently, renders information until coming to a lower right coordinate of the rendering range 915.

As described above, since the rendering processing means 104 repeatedly renders image data while incrementing writing destination addresses in an ascending order in accordance with a rendering repeat condition, the rendering processing means 104 can operate independently from the central processing means 101 while the repetitive rendering is performed. Accordingly, a load applied to the central processing means 101 can be reduced. Furthermore, the number of rendering requests can be reduced which is preferable in terms of save of a storage region.

Furthermore, by performing the rendering process starting from an upper portion of image data obtained by shifting image data by surpluses obtained by dividing coordinate values at an upper-left coordinate of a rendering range by a width and a height of the image data, portions of the image data can be extracted and displayed and various rendering processes can be performed. Also in this case, when compared with a case where a line rendering process is performed, the number of rendering calculations can be reduced, and accordingly, efficiency of the rendering process can be improved.

Embodiment 6

Figure 24:
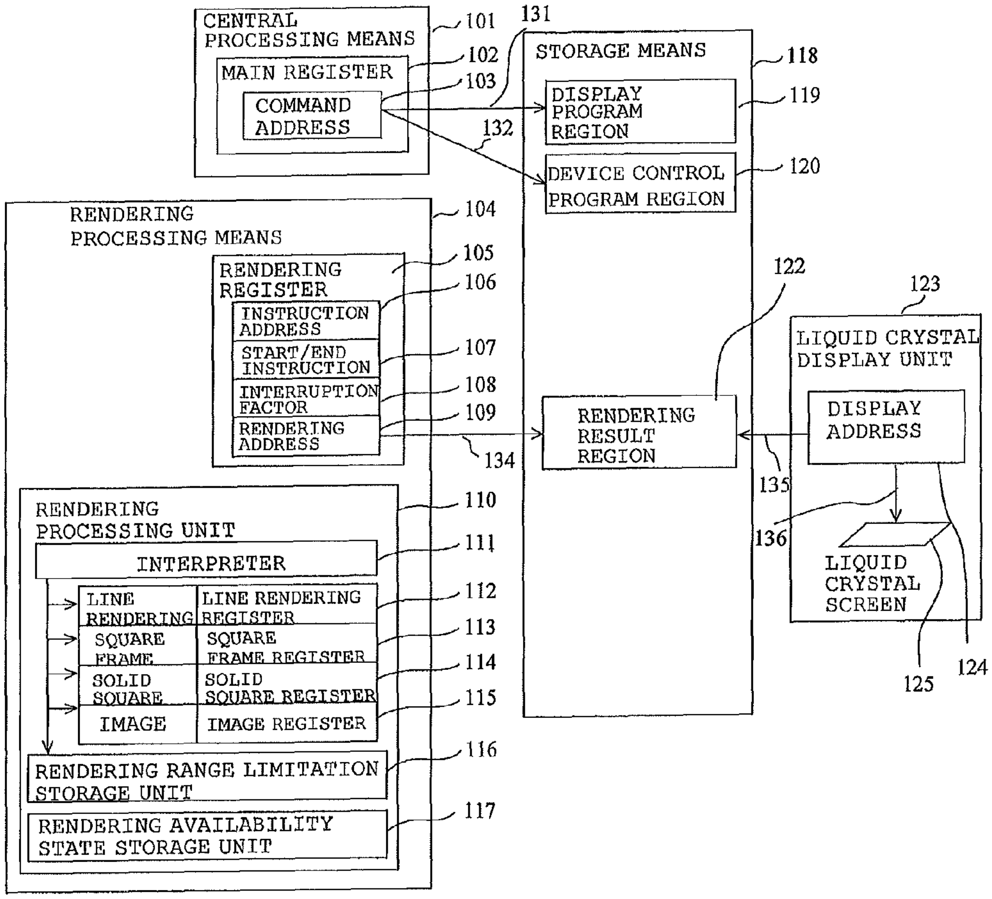
FIG. 24 is a block diagram illustrating functions of a state display device according to Embodiment 6.

FIG. 24 is a block diagram illustrating a function of a state display device according to Embodiment 6.

The state display device of Embodiment 6 has a configuration the same as that described in Embodiment 1, and additionally includes a line rendering function register 112*b*, a square frame rendering function register 113*b*, a solid square rendering function register 114*b*, and an image rendering function register 115*b*. These registers are collectively referred to as "function registers".

Furthermore, storage means 118 does not include a rendering request region 121.

Other configurations are the same as those of Embodiment 1 described above, and only main portions are shown in FIG. 24.

In Embodiment 1 described above, the central processing means 101 individually writes rendering requests to the rendering request region 121.

However, in Embodiment 6, central processing means 101 writes rendering requests regarding various rendering functions to the line rendering function register 112*b*, the square frame rendering function register 113*b*, the solid square rendering function register 114*b*, and the image rendering function register 115*b*.

When a rendering request corresponding to one of the function registers is written, a corresponding one of the rendering functions performs rendering in accordance with the rendering request.

According to this method, the rendering request is not required to be issued through the storage means 118, and accordingly, an I/O process load regarding the rendering process can be reduced.

The state display devices according to Embodiment 1 to Embodiment 6 are applicable to a display device which displays a state of an air conditioner, and in addition, are applicable to display devices of various electric devices which display a power-activation state, a power shut-down method, and a device state by an image, a diagram, text, or the like.

REFERENCE SIGNS LIST

1 state display device, 100 controller, 101 central processing means, 102 main register, 103 command address register, 104 rendering processing means, 105 rendering register, 106 instruction address register, 107 start/end instruction register, 108 interruption factor register, 109 rendering address register, 110 rendering processing unit, 111 interpreter, 112 line rendering circuit, 113 square frame rendering circuit, 114 solid square rendering circuit, 115 image rendering circuit, 116 rendering range limitation storage unit, 116*a* request limitation, 116*b* rendering limitation, 117 rendering availability state storage unit, 118 storage means, 119 display program region, 120 device control program region, 121 rendering request region, 121*a* rendering request region, 121*b* rendering request region, 122 rendering result region, 123 liquid crystal display unit, 124 display address register, 125 liquid crystal screen, 126 liquid crystal controller, 131 to 135 arrow mark, 200 rendering request group, 201 to 206 rendering request, 203A rendering request, 300 rendering request group, 300A rendering request group, 301 to 304 rendering request, 301*a* instruction type, 301*b* rendering function type, 301*c* upper-left coordinate, 301*d* lower-right coordinate, 301*e* line thickness, 301*f* rendering color, 303A rendering request, 305 screen image, 401 square frame, 402 solid square, 403 line, 404 rectangular region, 501 and 506 rendering request group, 502 to 505 rendering request, 507 to 509 rendering request, 601 rendering request, 601*a* rendering starting instruction, 601*c* rendering range upper-left coordinate, 601*d* rendering range lower-right coordinate, 601*e* rendering repeat condition, 601*f* rendering image address, 602 image data, 603 image data, 610 rendering range, 701 rendering range, 710 rendering range, 801 rendering request, 801*a* rendering start instruction, 801*c* rendering-range upper-left coordinate, 801*d* rendering-range lower-right coordinate, 801*e* rendering repeat condition, 801*f* rendering image address, 802 rendering request, 802*a* rendering start instruction, 802*c* rendering-range upper-left coordinate, 802*d* rendering-range lower-right coordinate, 802*e* rendering repeat condition, 802*f* rendering image address, 901 rendering request, 901*c* rendering-range upper-left coordinate, 901*d* rendering-range lower-right coordinate, 901*f* rendering image address, 902 rendering request, 902*c* rendering-range upper-left coordinate, 902*d* rendering-range lower-right coordinate, 902*f* rendering image address, 903 rendering request, 903*c* rendering-range upper-left coordinate, 903*d* rendering-range lower-right coordinate, 903*f* rendering image address, 904 rendering request, 904*c* rendering-range upper-left coordinate, 904*d* rendering-range lower-right coordinate, 904*f* rendering image address, 905 rendering request, 905*c* rendering-range upper-left coordinate, 905*d* rendering-range lower-right coordinate, 905*f* rendering image address, 911 rendering range, 912 rendering range, 913 rendering range, 914 rendering range, 915 rendering range, 951 image height, 952 image width, 955 rendering width, 956 rendering height, 961 rectangular region, 971 arrow mark, 981 rectangular region, 991 arrow mark, 1101 rendering range, 112*b* line rendering function register, 113*b* square frame rendering function register, 114*b* solid square rendering function register, 115*b* image rendering function register

The invention claimed is:

1. A state display device comprising:

a liquid crystal display unit;

a rendering processing unit which performs rendering calculation required for said liquid crystal display unit to display a screen;

a central processing unit which generates a rendering request which causes said rendering processing unit to perform rendering calculation; and a storage unit which data can be read from or written to by said rendering processing unit and said central processing unit, wherein said rendering request includes a rendering range to be displayed in said liquid crystal display unit, said central processing unit stores said rendering request in said storage unit, said storage unit stores image data, said rendering processing unit includes a register which stores an address in which said rendering request is stored in said storage unit, obtains said rendering request stored in said address kept in said register from said storage unit, performs the rendering calculation in response to said rendering request to store rendering data required for said liquid crystal display unit to display a screen, said rendering calculation includes calculating a surplus Mod(X) by dividing each display coordinate in said liquid crystal display unit which is represented by said rendering range by a width of said image data, and generating said rendering data of the shifting of pixel data of said image data rightward by said surplus Mod(X), and said liquid crystal display unit performs screen display based on said rendering data stored in said storage unit.

2. The state display device of claim 1, wherein said rendering calculation includes calculating a surplus Mod(Y) by dividing each display coordinate in said liquid crystal display unit which is represented by said rendering range by a height of said image data, and generating said rendering data of the shifting of pixel data of said image data downward by said surplus Mod(Y).

3. A state display device comprising:

a liquid crystal display unit;

a rendering processing unit which performs rendering calculation required for said liquid crystal display unit to display a screen;

a central processing unit which generates a rendering request which causes said rendering processing unit to perform rendering calculation; and a storage unit which data can be read from or written to by said rendering processing unit and said central processing unit, wherein said rendering request includes a rendering range to be displayed in said liquid crystal display unit, said central processing unit stores said rendering request in said storage unit, said storage unit stores image data, said rendering processing unit includes a register which stores an address in which said rendering request is stored in said storage unit, obtains said rendering request stored in said address kept in said register from said storage unit, performs the rendering calculation to generate rendering data in response to said rendering request and stores rendering data required for said liquid crystal display unit to display a screen, said rendering calculation includes calculating a surplus Mod(X) by dividing a display coordinate at a left end of said rendering range on said liquid crystal display unit by a width of said image data, rendering a first pixel data of said image data on the left end display coordinate of said rendering range, wherein the first pixel data is a pixel data at a position shifted rightward from a left end pixel of said image data by the surplus Mod(X), and rendering pixel data of said image data on rightward display coordinates of the left end display coordinate of said rendering range continuously, wherein the rendered pixel data are pixel data of said image data that are located on the right side of first pixel data of said image data, and when rendering, rendering pixel data located on the right side of the left end pixel of said image data continuously including a right end pixel of said image data before rendering a pixel data on a right end display coordinate of said rendering range, and said liquid crystal display unit performs screen display based on said rendering data stored in said storage unit.

4. The state display device of claim 3, wherein said rendering calculation includes calculating a surplus Mod(Y) by dividing a top display coordinate of said rendering range on said liquid crystal display unit by a height of said image data, rendering said first pixel data of said image data on the top end display coordinate of said rendering range, wherein the first pixel data is at a position shifted downward from a top end pixel of said image data by the surplus Mod(Y), and rendering pixel data of said image data on downward display coordinates of the top end display coordinate of said rendering range continuously, wherein the rendered pixel data are pixel data of said image data that are located on the bottom side of said first pixel data of said image data, and when rendering, rendering pixel data located on the bottom side of top end pixel of said image data continuously including a bottom end pixel of said image data before rendering the pixel data on a bottom end of said rendering range.

5. The state display device of claim 1, wherein said rendering request is configured such that, when a continuing next rendering command exists, said rendering processing unit is made to write an address of the next rendering request in said storage unit into said register.

6. The state display device of claim 1, wherein said liquid crystal display unit includes a full-dot liquid crystal display device, said rendering processing unit causes said storage unit to store values about a luminous position and a luminous color in said liquid crystal display unit as said rendering data, and said liquid crystal display unit performs screen display based on said luminous position and said luminous color specified by said rendering data.

* * * * *